(12) United States Patent
Hirakawa et al.

(10) Patent No.: US 11,822,076 B2
(45) Date of Patent: Nov. 21, 2023

(54) IMAGE DISPLAY DEVICE, IMAGE PROJECTION DEVICE, AND MOVING BODY

(71) Applicant: Ricoh Company, Ltd., Tokyo (JP)

(72) Inventors: Makoto Hirakawa, Tokyo (JP); Daisuke Ichii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 587 days.

(21) Appl. No.: 16/981,551

(22) PCT Filed: Mar. 14, 2019

(86) PCT No.: PCT/JP2019/010637
§ 371 (c)(1),
(2) Date: Sep. 16, 2020

(87) PCT Pub. No.: WO2019/181746
PCT Pub. Date: Sep. 26, 2019

(65) Prior Publication Data
US 2021/0116707 A1 Apr. 22, 2021

(30) Foreign Application Priority Data

Mar. 19, 2018 (JP) ................................ 2018-050900
Oct. 12, 2018 (JP) ................................ 2018-193809

(51) Int. Cl.
*G02B 26/08* (2006.01)
*G02B 27/01* (2006.01)
(Continued)

(52) U.S. Cl.
CPC .......... *G02B 27/0101* (2013.01); *B60K 35/00* (2013.01); *G02B 26/0833* (2013.01);
(Continued)

(58) Field of Classification Search
CPC ............ G02B 27/0101; G02B 26/0833; G02B 26/101; G02B 2027/012;
(Continued)

(56) References Cited

U.S. PATENT DOCUMENTS 8,736,964 B2 5/2014 Imahori et al.
9,158,124 B2 10/2015 Saisho et al.
(Continued)

FOREIGN PATENT DOCUMENTS

EP 3 012 681 A1 4/2016
JP 2002-189252 A 7/2002
(Continued)

OTHER PUBLICATIONS

International Search Report and Written Opinion dated Jun. 14, 2019 in PCT/JP2019/010637 filed on Mar. 14, 2019.
(Continued)

*Primary Examiner* — Euncha P Cherry
(74) *Attorney, Agent, or Firm* — XSENSUS LLP

(57) ABSTRACT

Disclosed is an image display device for displaying an image on a screen. The image display device includes an image forming element configured to optically scan a screen, and an optical member disposed between the screen and the image forming element, and being configured to reflect light, where the optical member is disposed such that the reflected light, along normals with respect to every reflecting point on the optical member, is directed away from the screen.

8 Claims, 22 Drawing Sheets

(51) Int. Cl.
    *B60K 35/00* (2006.01)
    *G02B 26/10* (2006.01)

(52) U.S. Cl.
    CPC .... *G02B 26/101* (2013.01); *B60K 2370/1529* (2019.05); *B60K 2370/23* (2019.05); *B60K 2370/334* (2019.05); *G02B 2027/012* (2013.01)

(58) Field of Classification Search
    CPC .... G02B 2027/0118; G02B 2027/0145; B60K 35/00; B60K 2370/1529; B60K 2370/23; B60K 2370/334; B60K 2370/785
    See application file for complete search history.

(56) References Cited

U.S. PATENT DOCUMENTS

| | | |
|---|---|---|
| 10,031,343 B2 | 7/2018 | Saisho et al. |
| 10,078,217 B2 | 9/2018 | Hayashi et al. |
| 2012/0099032 A1 | 4/2012 | Ishikawa |
| 2017/0115485 A1 | 4/2017 | Saito et al. |
| 2017/0154406 A1 | 6/2017 | Atsuumi et al. |
| 2018/0252916 A1 | 9/2018 | Nakamura et al. |
| 2018/0373025 A1* | 12/2018 | Miyatake ............. G02B 26/101 |

FOREIGN PATENT DOCUMENTS

| | | |
|---|---|---|
| JP | 2012-093506 A | 5/2012 |
| JP | 2013-088521 A | 5/2013 |
| JP | 2014-139656 A | 7/2014 |
| JP | 2015-007717 A | 1/2015 |
| JP | 2015-232692 A | 12/2015 |
| JP | 2015-232693 A | 12/2015 |
| JP | 2019-164324 A | 9/2019 |
| WO | WO2017/098913 A1 | 6/2017 |

OTHER PUBLICATIONS

Office Action dated Jul. 29, 2022, in corresponding Japanese patent Application No. 2018-193809, 4 pages.

* cited by examiner

[Fig. 1]
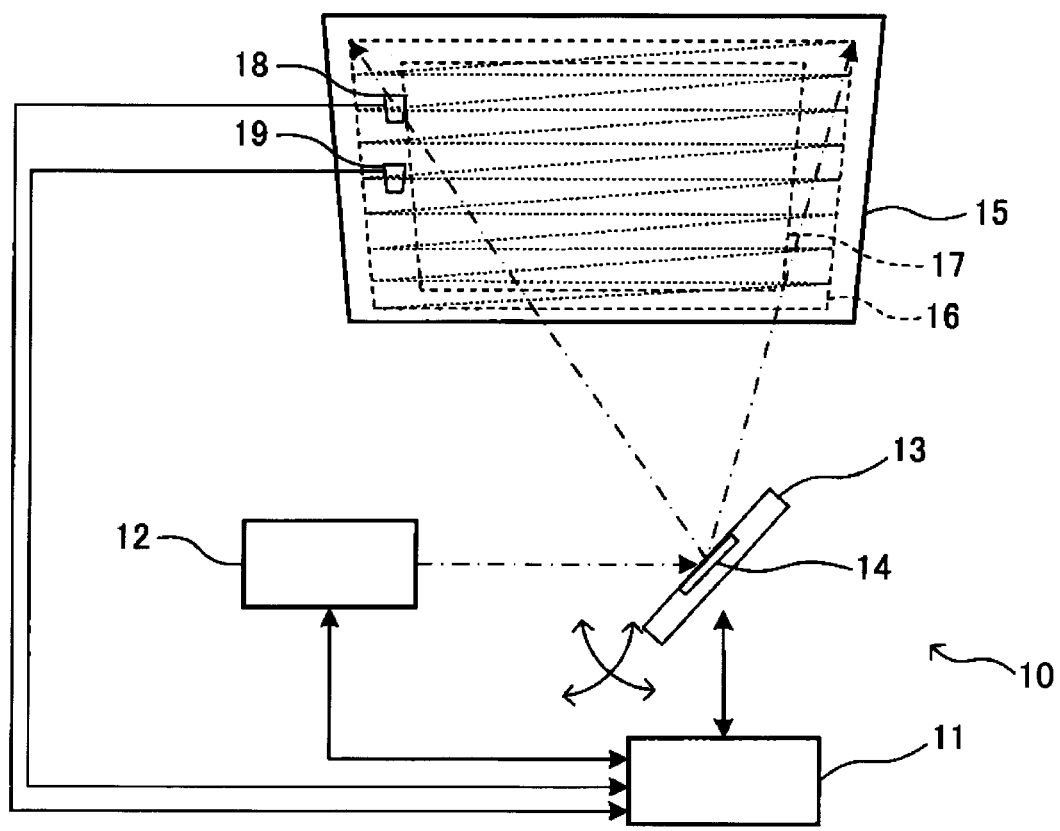

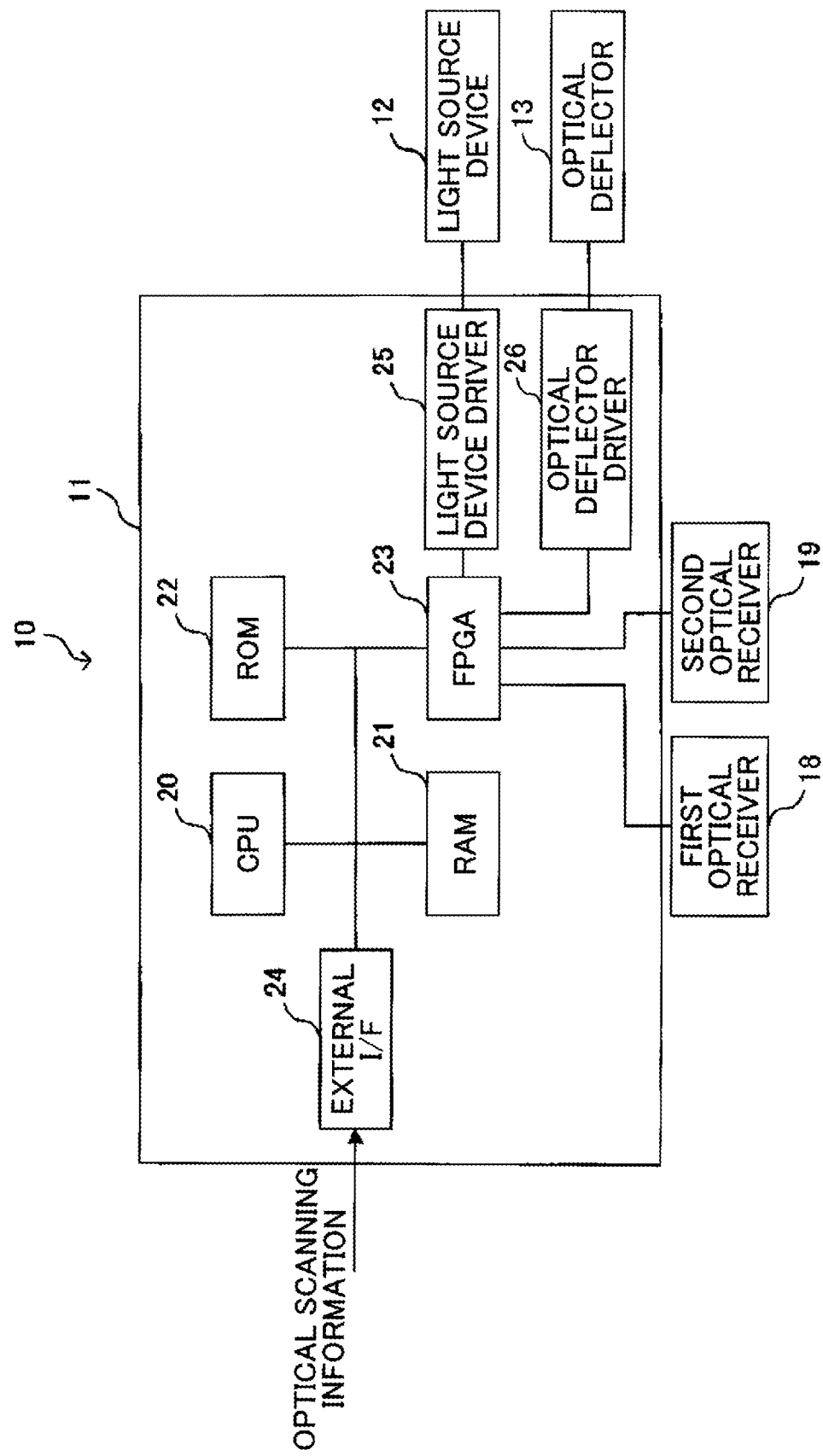
[Fig. 2]

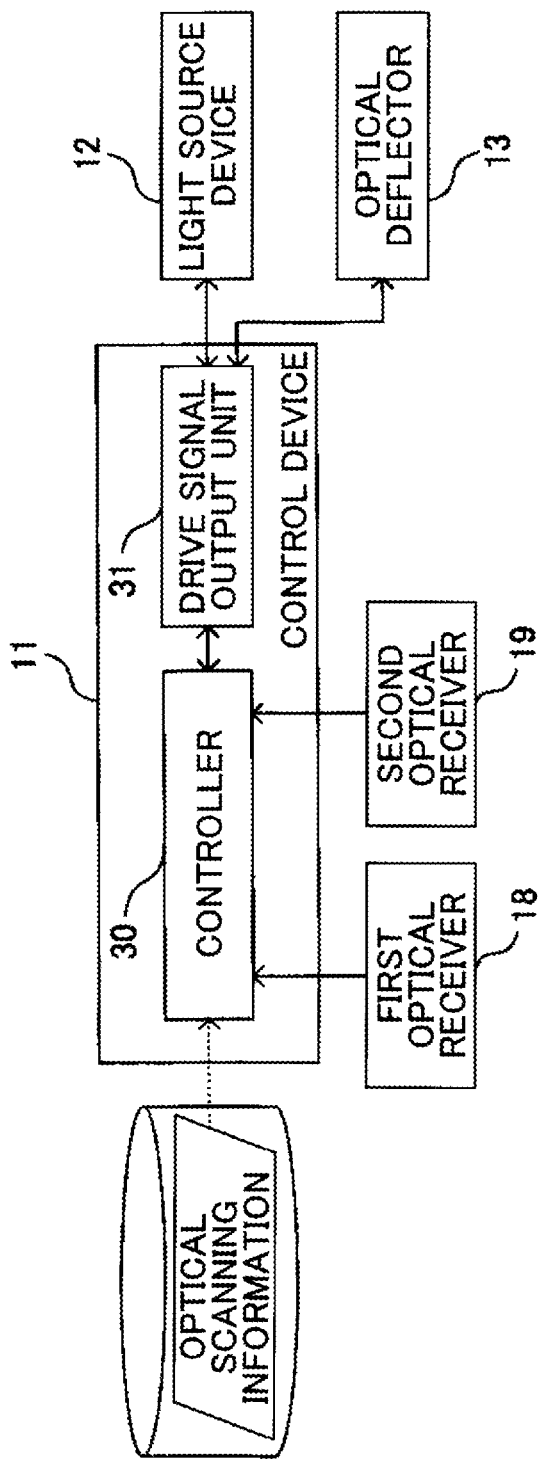
[Fig. 3]

[Fig. 4]
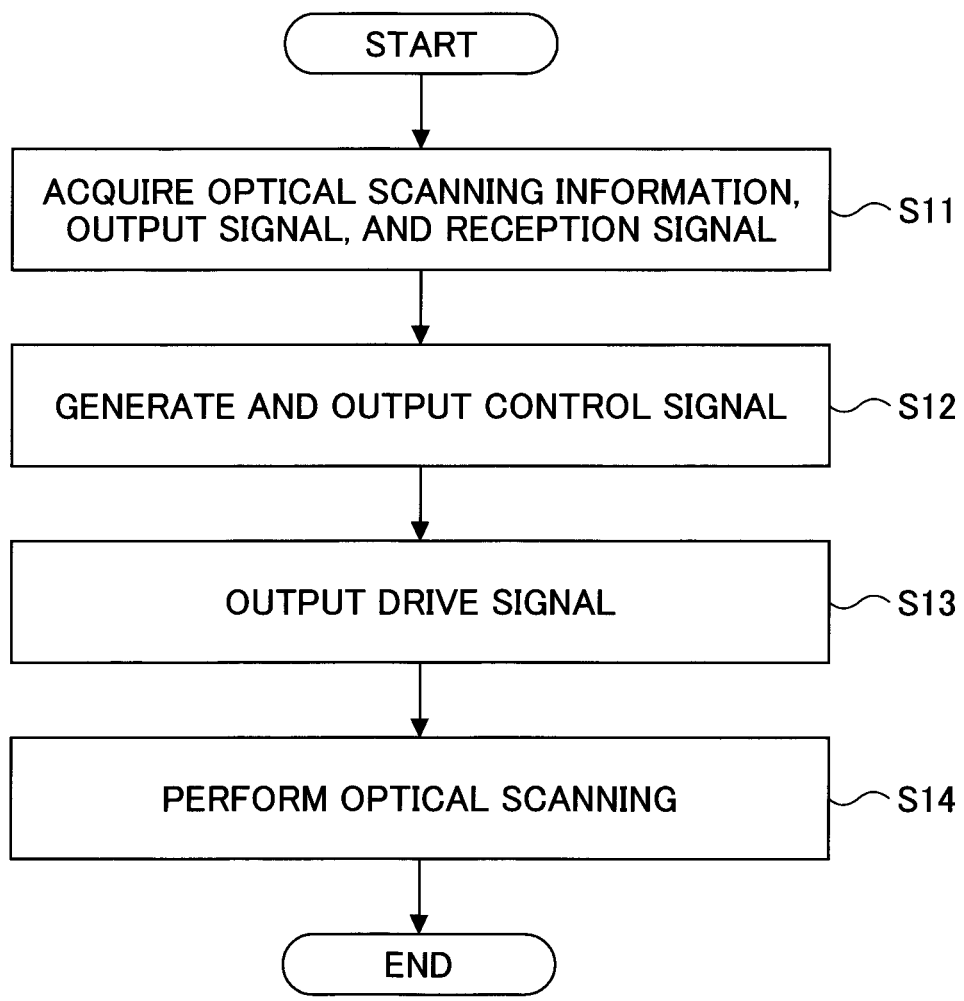

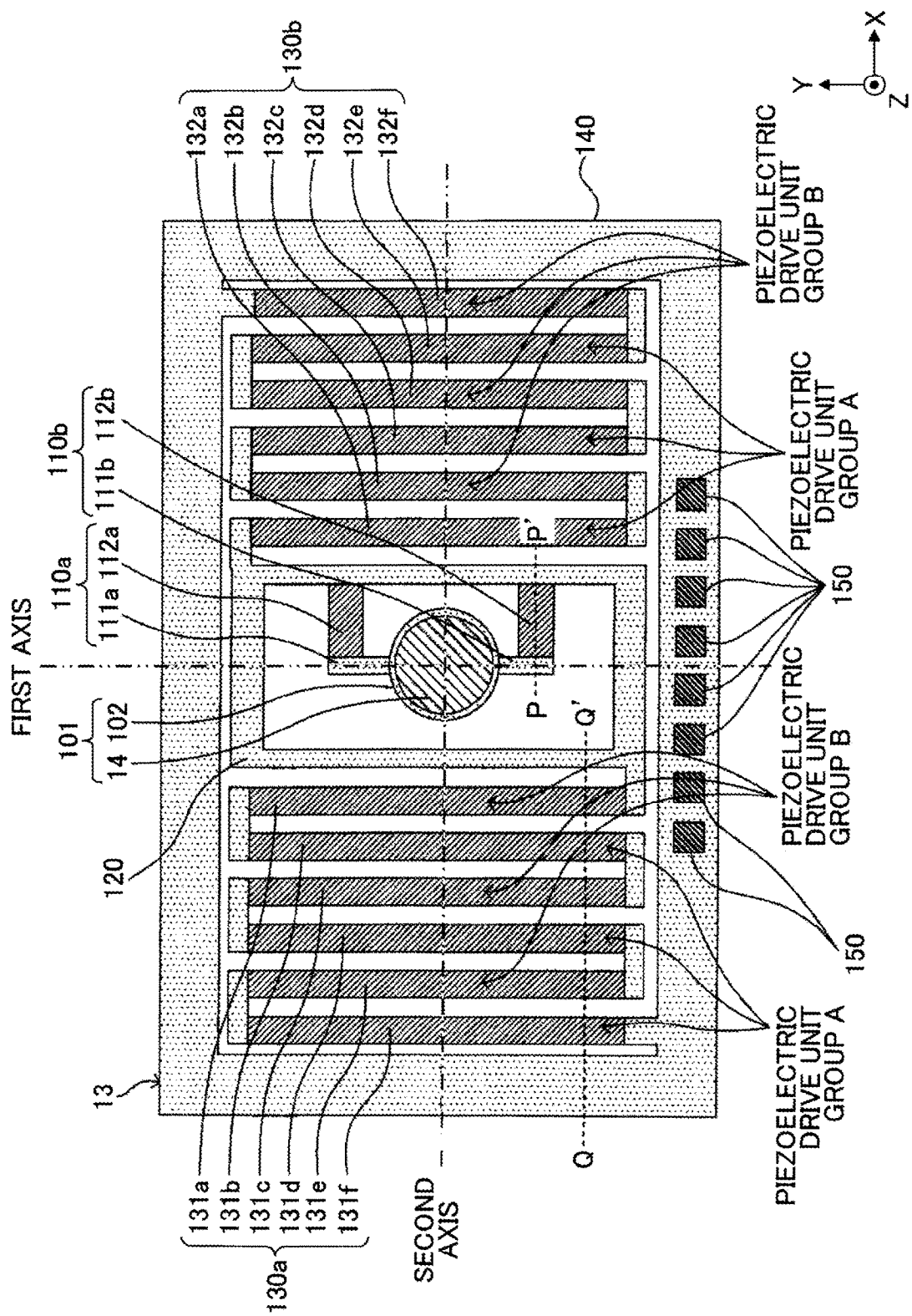
[Fig. 5]

[Fig. 6]
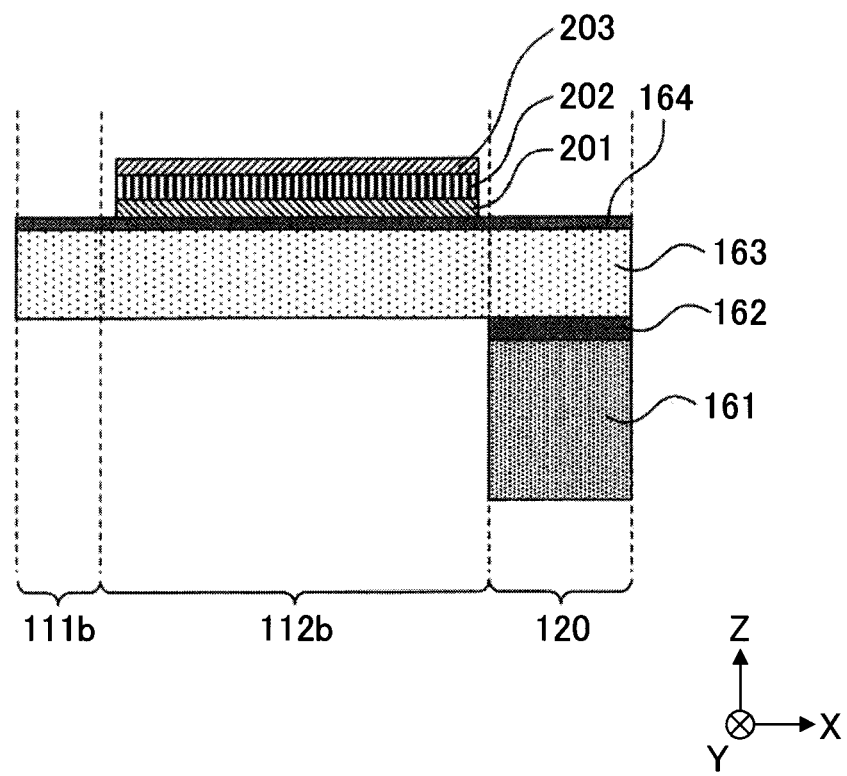

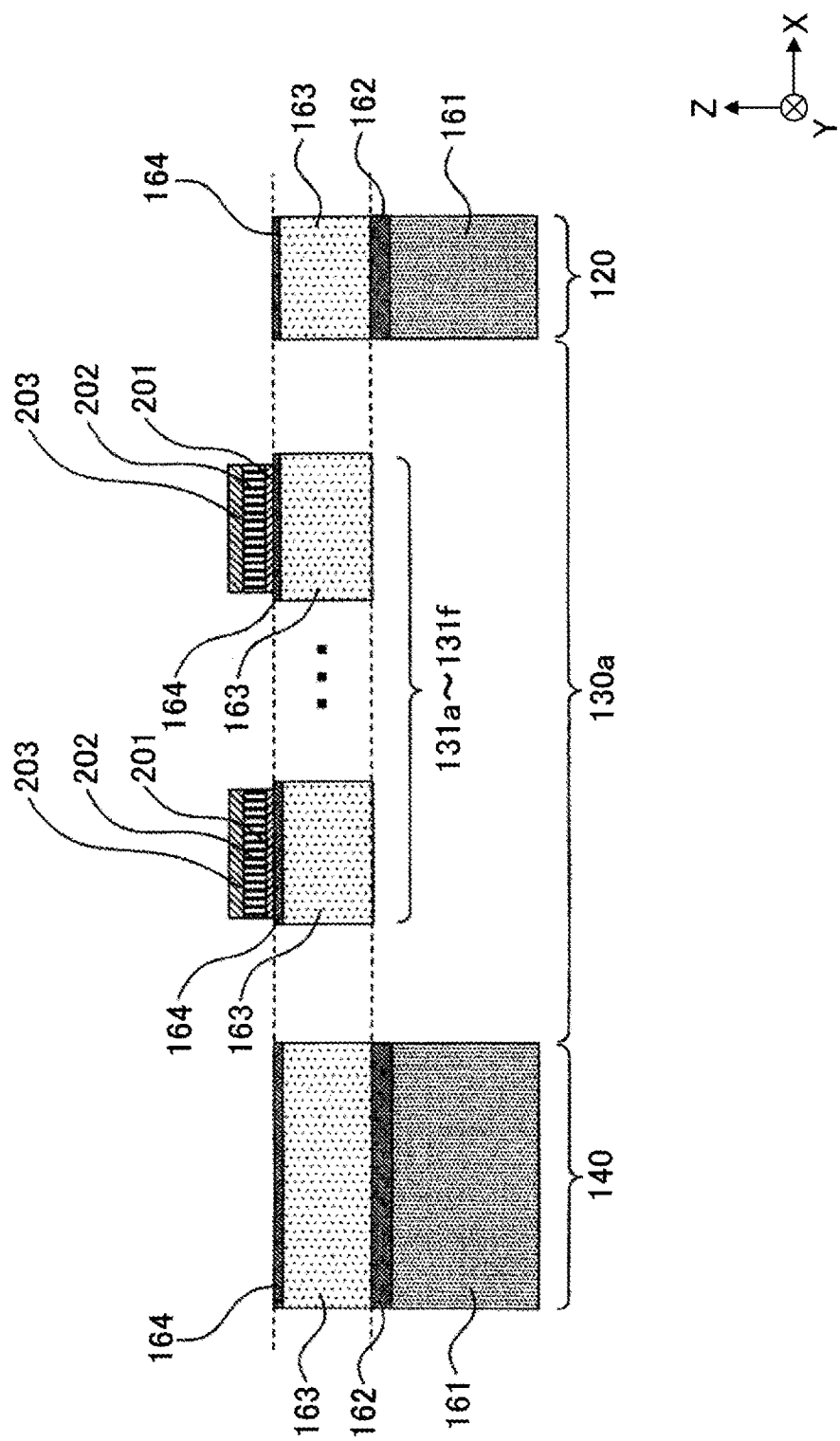
[Fig. 7]

[Fig. 8A]
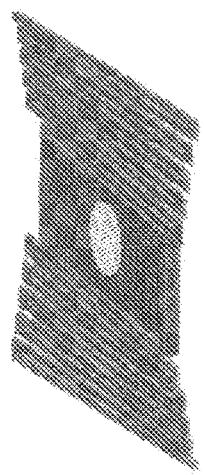
[Fig. 8B]
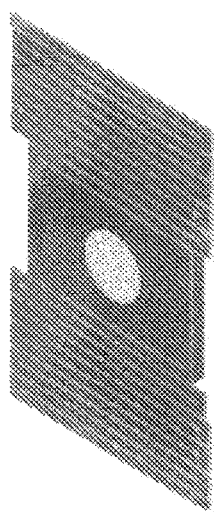

[Fig. 8C]
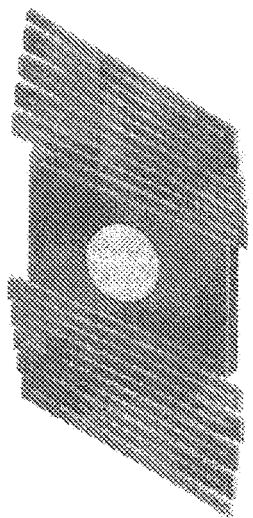

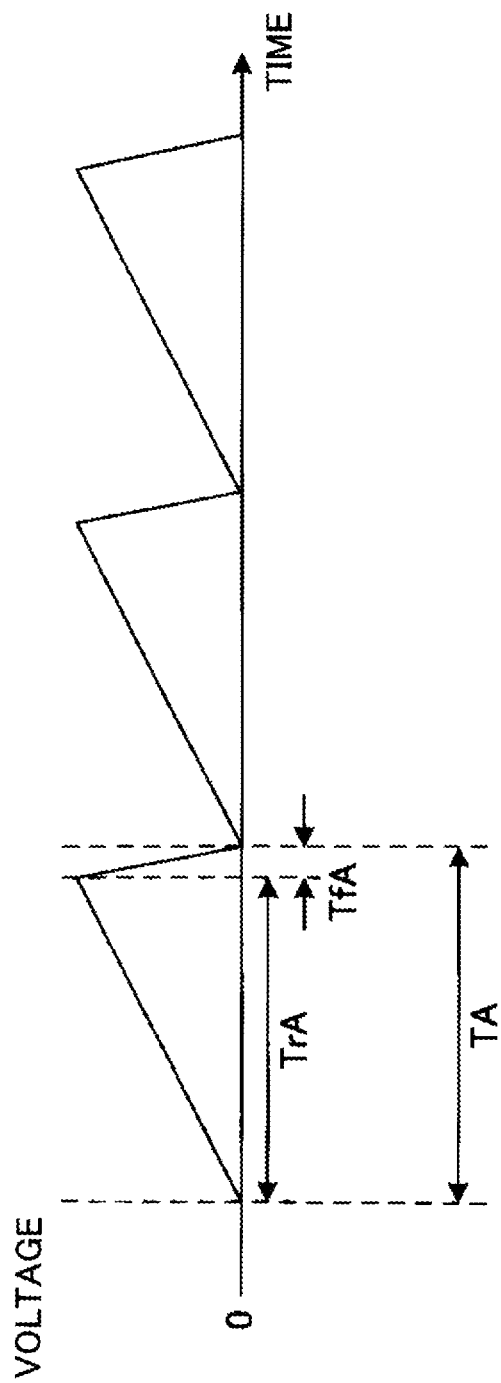
[Fig. 9A]

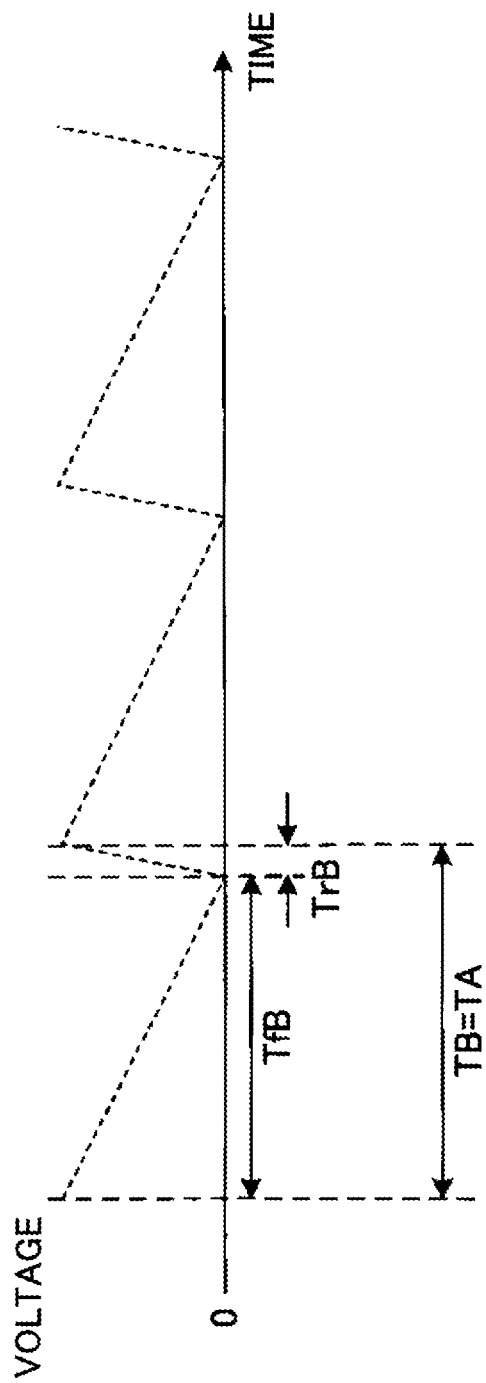

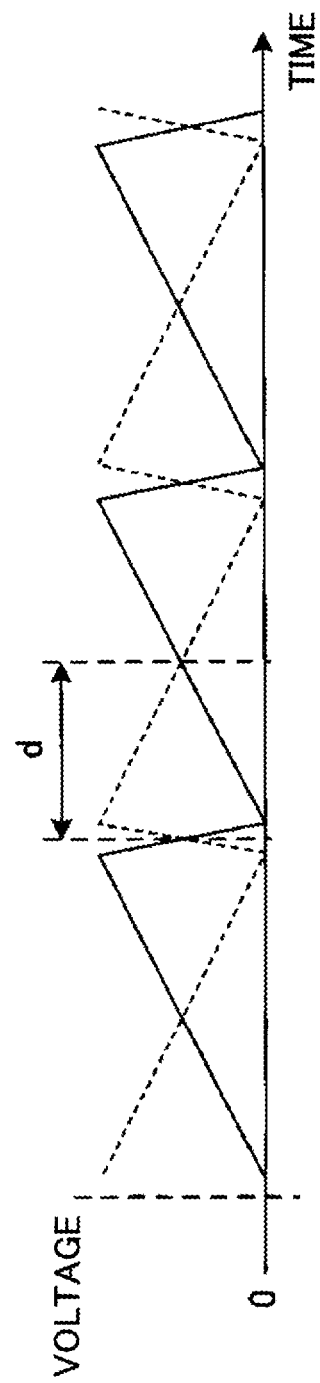
[Fig. 9C]

[Fig. 10]
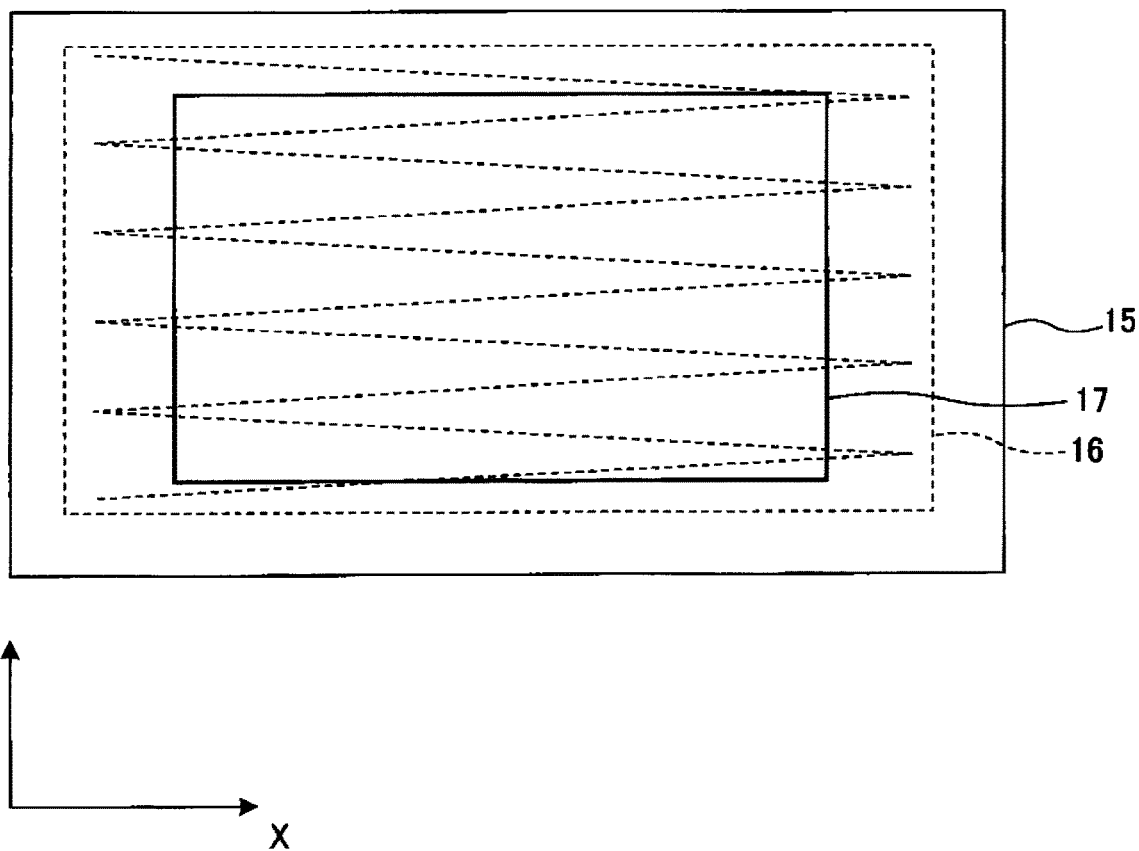

[Fig. 11]
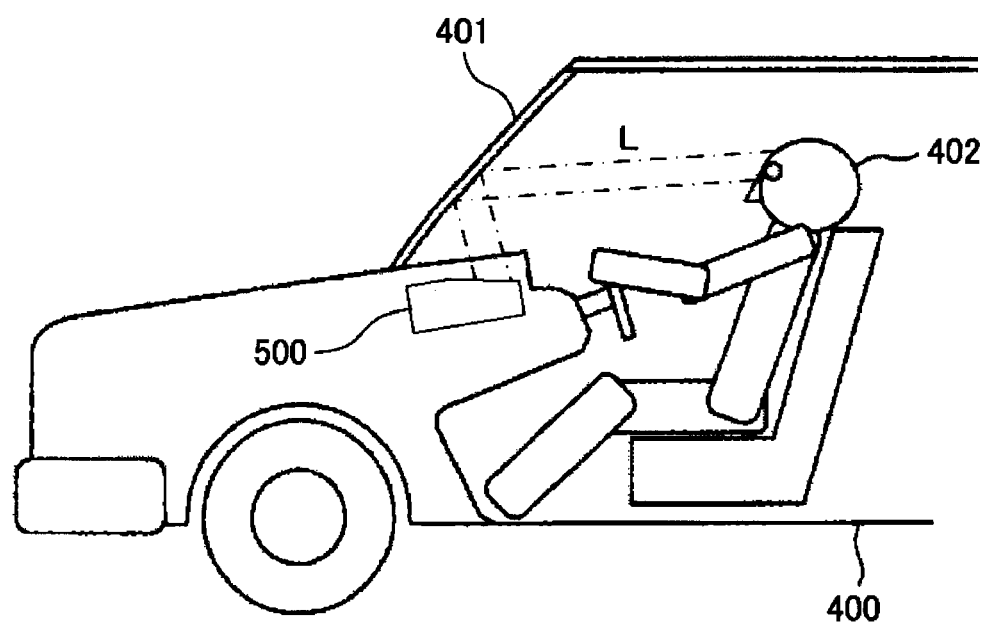

[Fig. 12]
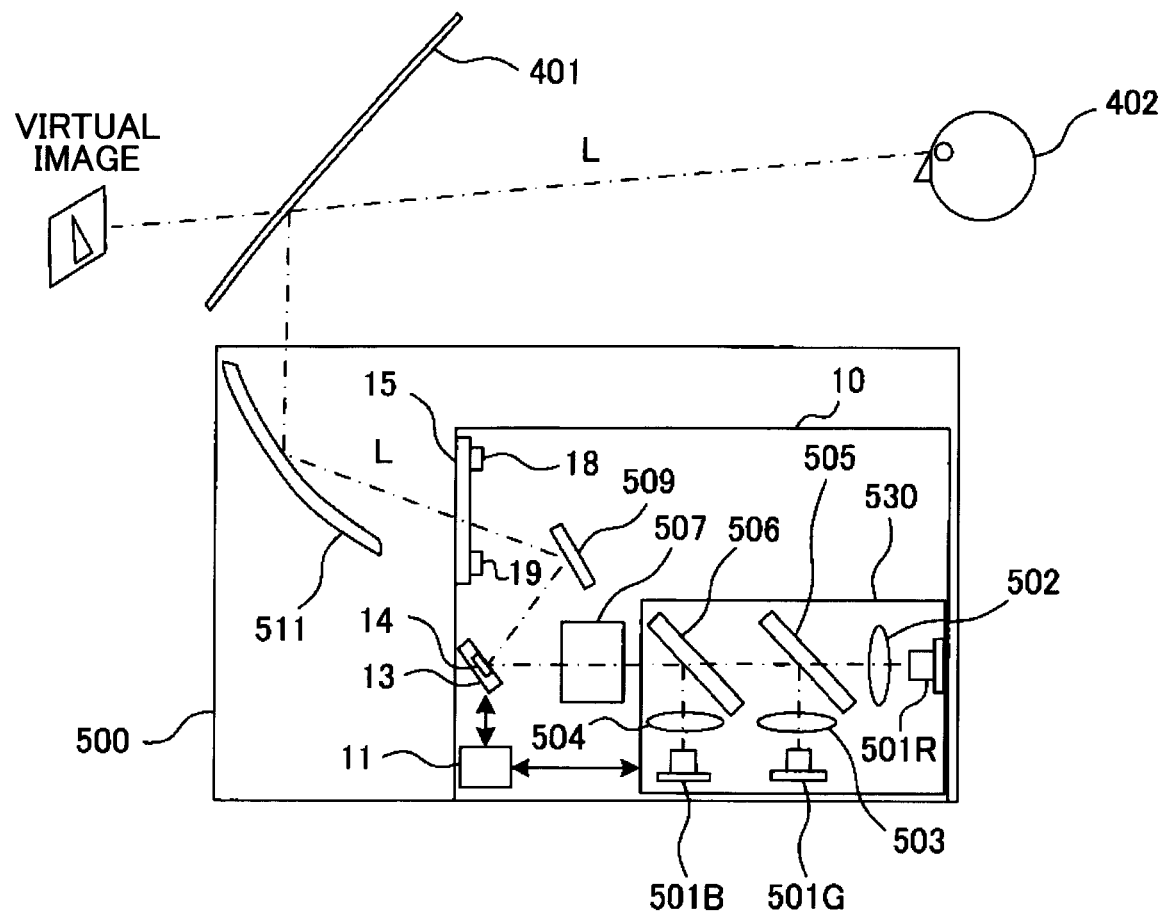

[Fig. 13]
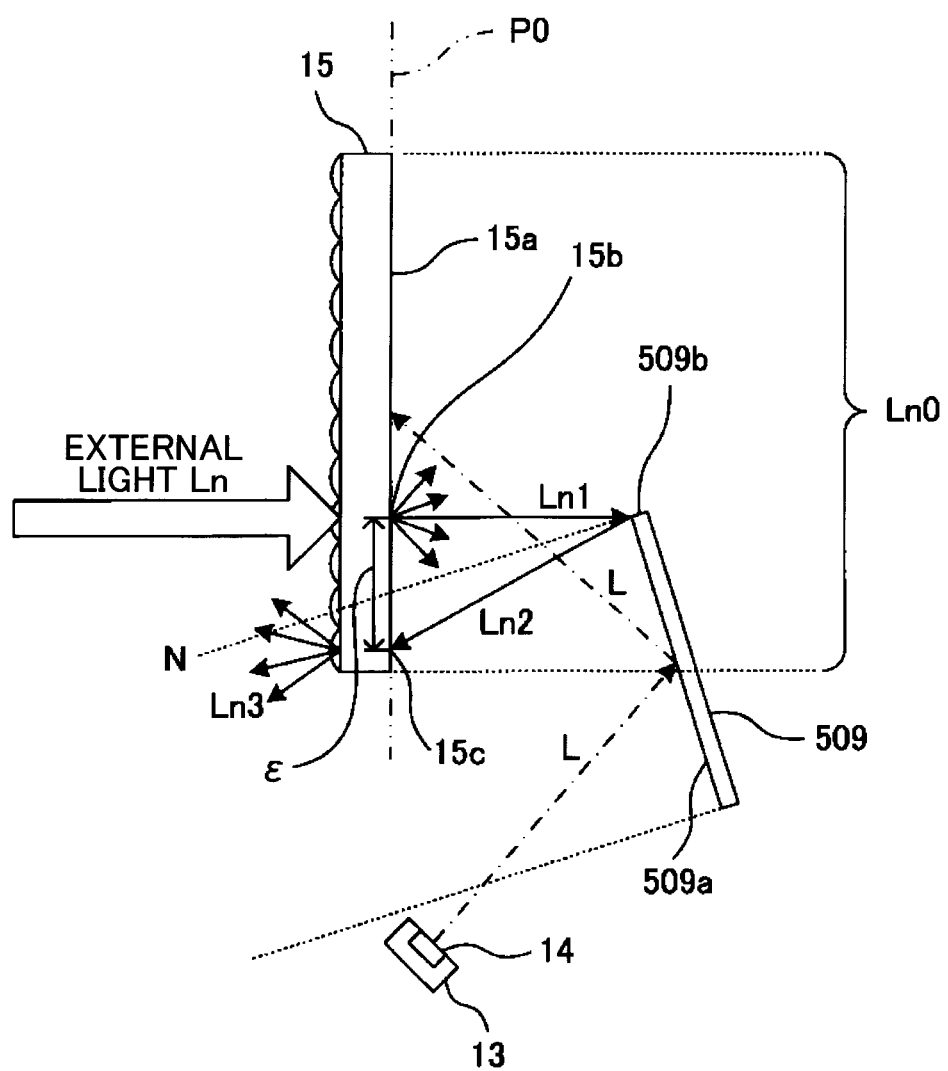

[Fig. 14]
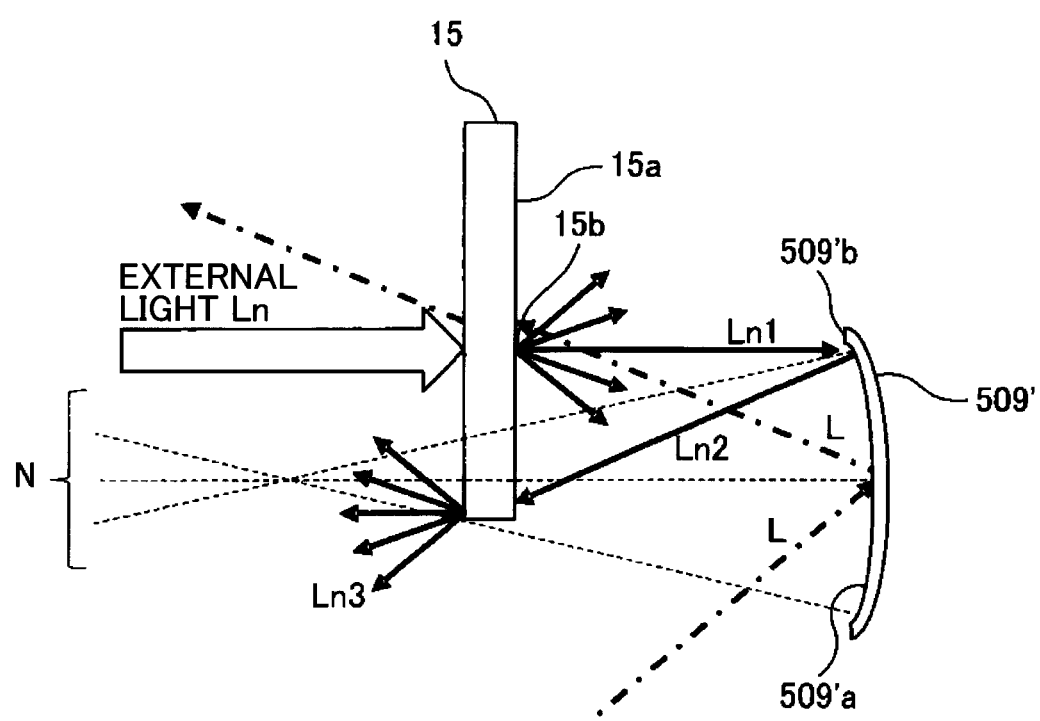

[Fig. 15]
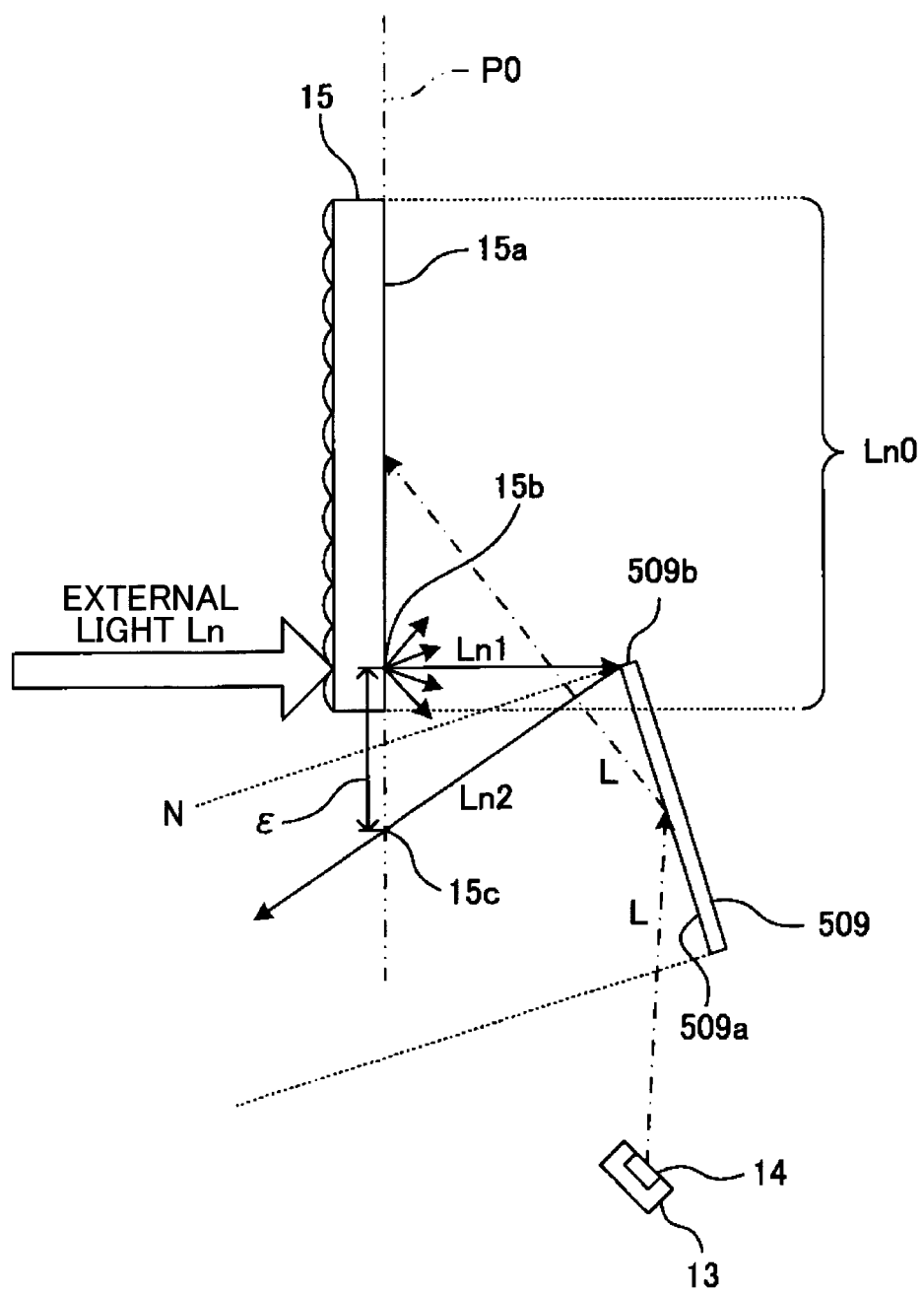

[Fig. 16]
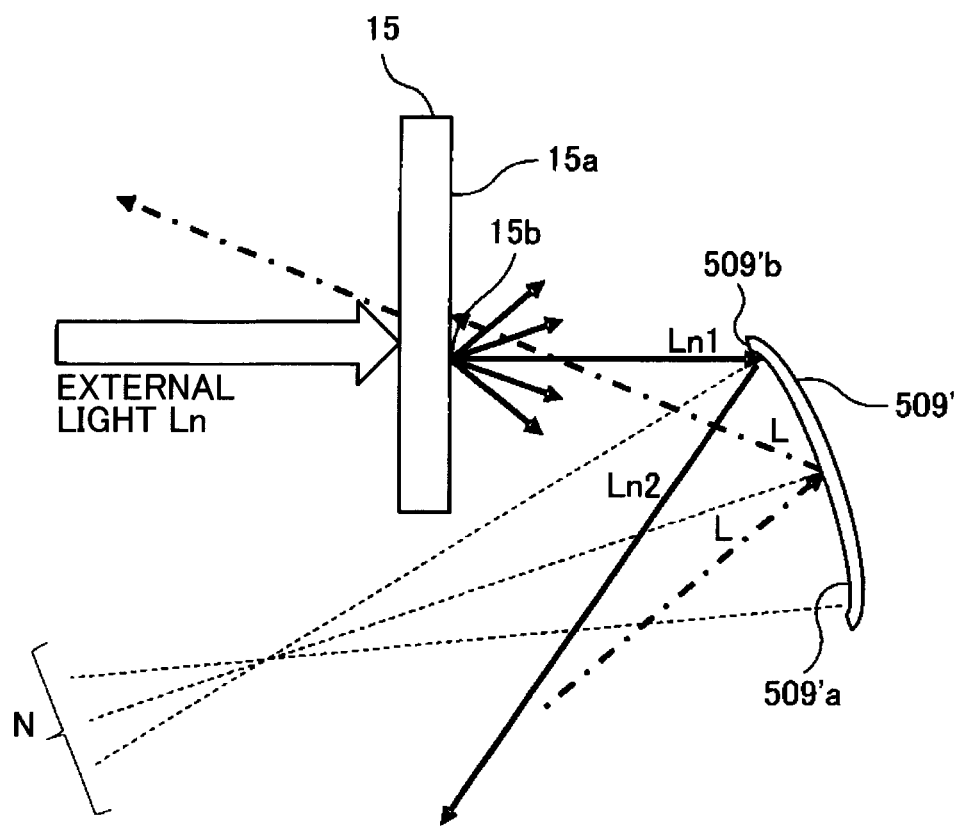

[Fig. 17]
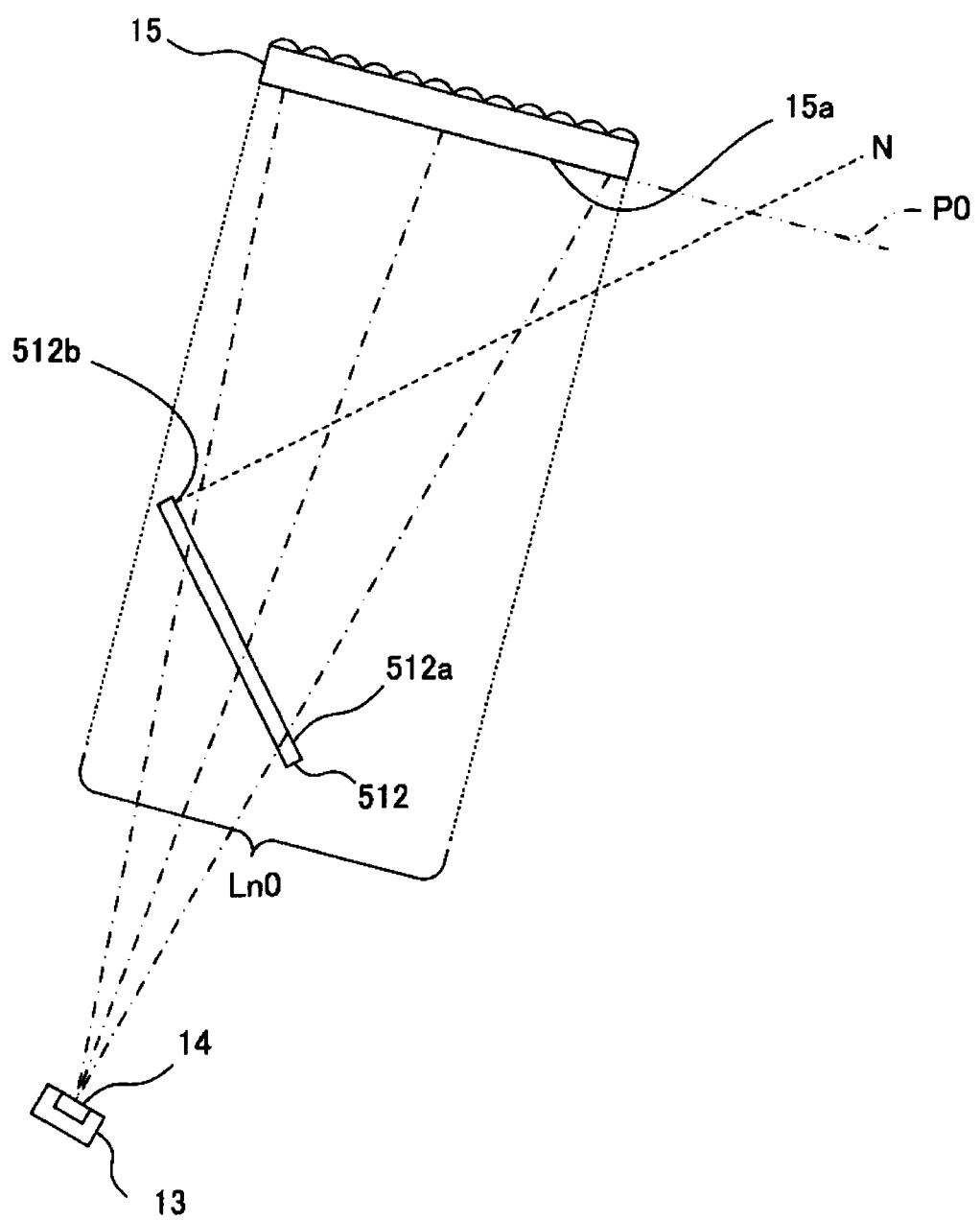

[Fig. 18]
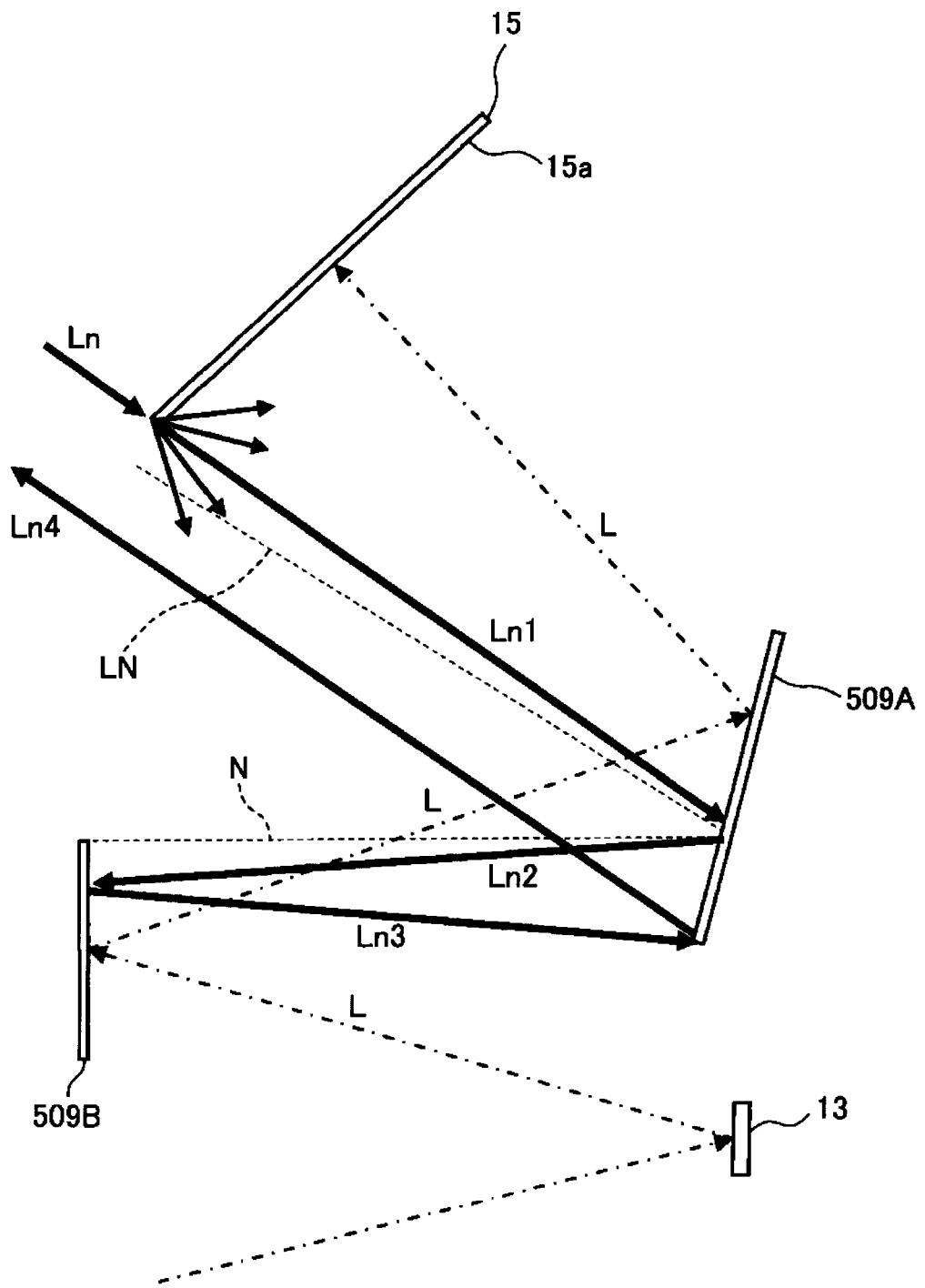

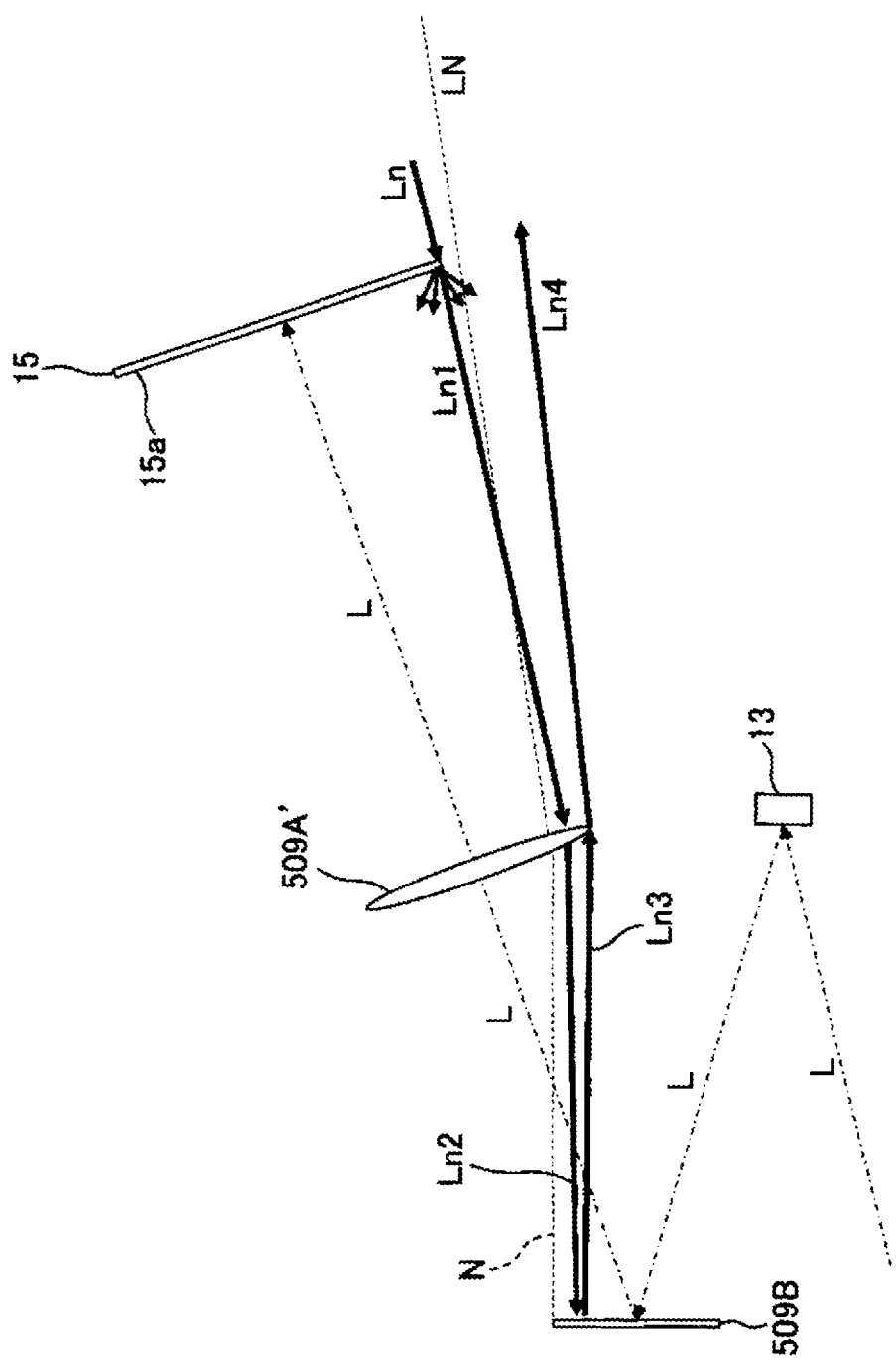
[Fig. 19]

IMAGE DISPLAY DEVICE, IMAGE PROJECTION DEVICE, AND MOVING BODY

TECHNICAL FIELD

The disclosures discussed herein relate to an image display device, an image projection device, and a moving body.

BACKGROUND ART

Image display devices are known to display images on a screen. Such images displayed on the image display devices may be used as intermediate images for use in head-up display (HUD) devices, for example.

Patent Document 1 discloses such an image display device applied to a head-up display (HUD) device (image projection device) installed on a vehicle (moving body). The image display device forms an intermediate image on a screen using an optical scanner to optically scan a screen configured by micromirrors arranged in an array. The intermediate image formed is magnified and projected by a magnifier having a reflecting surface. In the image display device, an optical positional relationship between the screen and the magnifier is defined such that external light, upon being reflected by the screen, will not return to a reflecting surface of the magnifying mirror, where the external light has been incident on the reflecting surface of the magnifier and traveled toward the screen. According to this image display device, it is possible to prevent the external light reflected by the screen from being superimposed on an image to deteriorate the visibility of the image.

CITATION LIST

Patent Literature

[PTL 1] Japanese Unexamined Patent Application Publication No. 2015-007717

SUMMARY OF INVENTION

Technical Problem

However, in the related-art image display device, the external light further entering the screen toward the light source may be reflected by a light emitting surface of an optical member made of a light reflecting member or a light transmitting member, which is disposed close to the light source. In this case, the reflected external light enters the screen by the same optical path as light that forms an image, and the entered external light becomes superimposed on the image on the screen; this causes deterioration in visibility of an image.

Solution to Problem

According to an aspect of embodiments, an image display device for displaying an image on a screen includes
an image forming element configured to optically scan a screen; and
an optical member disposed between the screen and the image forming element, and being configured to reflect light, wherein the optical member is disposed such that the reflected light, along normals with respect to every reflecting point on the optical member, is directed away from the screen.

According to embodiments of the present invention, it is possible to prevent deterioration in the visibility of an image due to reflected external light upon being reflected by a light emitting surface of an optical member, where the reflected external light results from external light entering the screen traveling toward a light source.

BRIEF DESCRIPTION OF DRAWINGS

FIG. 1 is a schematic diagram illustrating an example of an image display device according to an embodiment;

FIG. 2 is a hardware configuration diagram illustrating an example of the image display device;

FIG. 3 is a functional block diagram illustrating an example of a control device of the image display device;

FIG. 4 is a flowchart illustrating an example of a process relating to the image display device;

FIG. 5 is a plan view illustrating an example of an optical deflector of the image display device as viewed from a +Z direction;

FIG. 6 is a cross-sectional view illustrating the optical deflector illustrated in FIG. 5 taken along a line P-P';

FIG. 7 is a cross-sectional view illustrating the optical deflector illustrated in FIG. 5 taken along a line Q-Q';

FIG. 8A is a schematic view illustrating a deformation of second driving units of the optical deflector;

FIG. 8B is a schematic view illustrating a deformation of second driving units of the optical deflector;

FIG. 8C is a schematic view illustrating a deformation of second driving units of the optical deflector;

FIG. 9A is a graph illustrating an example of a waveform of a drive voltage A applied to a piezoelectric driving unit group A of an optical deflector;

FIG. 9B is a graph illustrating an example of a waveform of a drive voltage B applied to a piezoelectric driving unit group B of an optical deflector;

FIG. 9C is a graph illustrating an example in which the waveform of the drive voltage of FIG. 9A and the waveform of the drive voltage of FIG. 9B are superimposed;

FIG. 10 is a diagram illustrating optical scanning by the image display device;

FIG. 11 is a schematic diagram illustrating an example of an automobile equipped with a head-up display device to which the image display device is applied;

FIG. 12 is a schematic diagram illustrating an example of the head-up display device;

FIG. 13 is a diagram illustrating a situation in which visibility of a projected image is deteriorated by external light;

FIG. 14 is a diagram illustrating a situation in which visibility of a projected image is deteriorated by external light in the case where a planar mirror illustrated in FIG. 13 is replaced by a curved mirror;

FIG. 15 is a diagram illustrating an arrangement of a planar mirror according to an embodiment;

FIG. 16 is a diagram illustrating an arrangement in a case where the planar mirror illustrated in FIG. 15 is replaced by a curved mirror;

FIG. 17 is a diagram illustrating an arrangement of an IR cut filter in a first modification;

FIG. 18 is a diagram illustrating an arrangement of a first planar mirror and a second planar mirror in a second modification; and FIG. 19 is a diagram illustrating an arrangement in a case where the first planar mirror illustrated in FIG. 18 is replaced by a lens.

DESCRIPTION OF EMBODIMENTS

The following describes an embodiment of the present invention. First, an image display device according to an embodiment will be described with reference to the accompanying drawings.

FIG. 1 is a schematic diagram illustrating an example of an image display device according to an embodiment. As illustrated in FIG. 1, the image display device 10 deflects light emitted from a light source device 12 by a reflecting surface 14 of an optical deflector 13, and optically scans a screen member 15 to form an intermediate image, in accordance with the control of the control device 11. Note that the optical deflector 13 acts as an optical scanning member. The optical deflector 13 is configured to optical scan an optically scannable area called a scannable area 16, and the scannable area includes an effective scanning area 17. In the present embodiment, a "screen" includes at least the effective scanning area 17 on an incident surface of the screen member 15.

The image display device 10 includes the control device 11, the light source device 12, the optical deflector 13, a first optical receiver 18, and a second optical receiver 19.

The control device 11 is an electronic circuit unit including, for example, a CPU (Central Processing Unit) and an FPGA (Field-Programmable Gate Array). The light source device 12 is configured to emit laser light, for example. The optical deflector 13 is, for example, a MEMS (Micro Electromechanical Systems) device that includes a reflecting surface 14, and is configured to move the reflecting surface 14. The screen member 15 is, for example, a light diffusing member, and is specifically a microlens array, which is configured by two-dimensionally arranged microlenses. Note that the screen member 15 may be another member such as a light diffusing plate or the like; however, the screen member 15 is not necessarily be a light diffusing member. The first optical receiver 18 and the second optical receiver 19 are, for example, a PD (Photo Diode) that receives light and outputs a light reception signal.

The control device 11 generates control signals for controlling the light source device 12 and the optical deflector 13, based on optical scanning information (i.e., image information) acquired from an external device or the like, and outputs drive signals to the light source device 12 and the optical deflector 13, based on the generated control signals. The control device 11 synchronizes the light source device 12 and the optical deflector 13, or generates control signals for controlling the light source device 12 and the optical deflector 13, based on a signal output from the light source device 12, a signal output from the optical deflector 13, and a first light reception signal output from the first optical receiver 18, and a second light reception signal output from the second optical receiver 19.

The light source device 12 emits light from a light source based on a drive signal input from the control device 11.

The optical deflector 13 moves the reflecting surface 14 in at least one of a uniaxial direction (one-dimensional direction) and a biaxial direction (two-dimensional direction) based on a drive signal input from the control device 11, and deflects the light emitted from the light source device 12. Note that a drive signal has a predetermined drive frequency. The optical deflector 13 has a predetermined natural frequency (also referred to as resonance frequency).

With this configuration, based on the control of the control device 11 based on optical scanning information (image information), the control device 11 is enabled to reciprocate the reflecting surface 14 of the optical deflector 13 in two axial directions within a predetermined range to deflect and optically scan light incident from the light source device 12 onto the reflecting surface 14, thereby forming (projecting) a desired intermediate image on the screen member 15.

Details of the optical deflector 13 and control of the optical deflector 13 by the control device 11 will be described later.

Next, with reference to FIG. 2, a hardware configuration of an image display device will be described as an example. FIG. 2 is a hardware configuration diagram illustrating an example of the image display device. As illustrated in FIG. 2, the image display device 10 includes the control device 11, the light source device 12, the optical deflector 13, the first optical receiver 18, and the second optical receiver 19, which are electrically connected to one another. Among these, details of the control device 11 will be described below.

The control device 11 includes a CPU 20, a RAM (Random Access Memory) 21, a ROM (Read Only Memory) 22, an FPGA 23, an external I/F 24, a light source device driver 25, and an optical deflector driver 26.

The CPU 20 is an arithmetic and logic device configured to read programs and data from a storage device such as the ROM 22 onto the RAM 21, and execute processing to perform overall control and functions of the control device 11. The RAM 21 is a volatile storage device configured to temporarily retain programs and data.

The ROM 22 is a nonvolatile storage device configured to retain programs and data upon the power being turned off, and store processing programs and data to be executed by the CPU 20 for controlling respective functions of the image display device 10.

The FPGA 23 is a circuit configured to output control signals suitable for the light source device driver 25 and the optical deflector driver 26, in accordance with processing of the CPU 20. The FPGA 23 also acquires output signals of the light source device 12 and the optical deflector 13 via the light source device driver 25 and the optical deflector driver 26, further acquires light reception signals from the first optical receiver 18 and the second optical receiver 19, and generates control signals based on the output signals and the light reception signals.

The external I/F 24 is an interface with an external device, a network, or the like, for example. The external device includes, for example, a host device such as a PC (Personal Computer), a storage device such as a USB memory, an SD card, a CD, a DVD, an HDD, and an SSD. The network is, for example, a CAN (Controller Area Network), a LAN (Local Area Network) of an automobile, inter-vehicle communication, the Internet, and the like. The external I/F 24 may be configured to have connection or communication with an external device, and the external I/F 24 may be provided for each of the external devices.

The light source device driver 25 is an electric circuit configured to output a drive signal such as a drive voltage to the light source device 12 in accordance with an input control signal.

The optical deflector driver 26 is an electric circuit configured to output a drive signal such as a drive voltage to the optical deflector 13 in accordance with an input control signal.

In the control device 11, the CPU 20 acquires optical scanning information from an external device or a network via the external I/F 24. Note that the control device 11 may have any configuration such that the CPU 20 can acquire optical scanning information. The control device 11 may be configured to store optical scanning information in the ROM 22 or the FPGA 23 within the control device 11. The control device 11 may be configured to include a newly provided storage device such as an SSD within the control device 11 to store the optical scanning information in the newly provided storage device.

Note that the optical scanning information includes information indicating a method for the light source device 12 and the optical deflector 13 to optically scan the screen member 15. More specifically, the optical scanning information is image data for displaying an intermediate image by optical scanning.

Next, with reference to FIG. 3, a functional configuration example of the control device of the image display device 10 will be described. FIG. 3 is a functional block diagram illustrating an example of a control device of the image display device 10. The control device 11 according to the present embodiment is configured to provide functional components described below by instructions from the CPU 20 and hardware components illustrated in FIG. 2.

As illustrated in FIG. 3, the control device 11 has as functions of a controller 30 and a drive signal output unit 31. The controller 30 is a control unit implemented by, for example, the CPU 20, the FPGA 23 and the like. The controller 30 is configured to acquire optical scanning information or a signal from each device, generates a control signal based on the acquired information and signals, and outputs the generated control signal to the drive signal output unit 31.

For example, the controller 30 acquires image data as optical scanning information from an external device or the like, generates a control signal from the image data according to a predetermined process and outputs the control signal to the drive signal output unit 31. The controller 30 also acquires the respective output signals of the light source device 12 and the optical deflector 13 via the drive signal output unit 31, and generates control signals based on the acquired output signals of the light source device 12 and the optical deflector 13. Further, the controller 30 acquires respective light reception signals of the first optical receiver 18 and the second optical receiver 19, and generates control signals based on the respective light reception signals.

The drive signal output unit 31 is implemented by the light source device driver 25, the optical deflector driver 26, and the like. The drive signal output unit 31 is configured to output a drive signal to the light source device 12 or the optical deflector 13 based on an input control signal. The drive signal output unit 31 functions as, for example, an application unit that applies a drive voltage to the light source device 12 or to the optical deflector 13. The drive signal output unit 31 may be provided for each subject to output a drive signal.

The drive signal is a signal for controlling the driving of the light source device 12 or the optical deflector 13. For example, in the light source device 12, a drive signal is a drive voltage for controlling the emitting timing and intensity of the light source. Further, for example, in the optical deflector 13, a drive signal is a drive voltage for controlling the timing and movable range of moving the reflecting surface 14 of the optical deflector 13.

Next, with reference to FIG. 4, a process of optically scanning a screen member 15 by the image display device 10 will be described. FIG. 4 is a flowchart illustrating an example of a process relating to an image display device. In step S11, the controller 30 acquires optical scanning information from an external device or the like. The controller 30 also acquires respective output signals of the light source device 12 and the optical deflector 13 via the drive signal output unit 31, and also acquires respective reception signals of the first optical receiver 18 and the second optical receiver 19.

In step S12, the controller 30 generates a control signal from the acquired optical scanning information, respective output signals, and respective reception signals, and outputs a generated control signal to the drive signal output unit 31. In this step, the controller 30 may fail to acquire the respective output signals and the respective reception signal upon activation, and in such a case, the controller 30 may perform a predetermined operation in another step upon activation.

In step S13, the drive signal output unit 31 outputs a drive signal to the light source device 12 and to the optical deflector 13, based on the received control signal.

In step S14, the light source device 12 emits light based on the received drive signal. Further, the optical deflector 13 moves the reflecting surface 14 based on the received drive signal. By driving of the light source device 12 and the optical deflector 13, the emitted light is deflected and optically scanned in a desired direction.

In the image display device 10 of the present embodiment, one control device 11 has a function of controlling the light source device 12 and a function of controlling the optical deflector 13; however, a control device may be provided separately, for each of the light source device and the optical deflector.

In the image display device 10 of the present embodiment, one control device 11 has a function of the controller 30 of the light source device 12 and the optical deflector 13, and a function of the drive signal output unit 31; however, these functions may be separately provided. For example, a drive signal output device with a drive signal output unit 31 may be provided separately from the control device 11 with the controller 30.

Next, with reference to FIGS. 5 to 7, the optical deflector will be described in detail. FIG. 5 is a plan view of a two-axis optical deflector capable of deflecting light in two axial directions. FIG. 6 is a cross-sectional view taken along a line P-P' of FIG. 5. FIG. 7 is a cross-sectional view taken along a line Q-Q' of FIG. 5.

As illustrated in FIG. 5, the optical deflector 13 includes a mirror unit 101 configured to reflect incident light; first driving units 110a and 110b connected to the mirror unit 101, and configured to drive the mirror unit 101 around a first axis parallel to a Y axis; a first supporting unit 120 configured to support the mirror unit 101 and the first driving units 110a and 110b; second driving units 130a and 130b connected to the first supporting unit, and configured to drive the mirror unit 101 and the first supporting unit 120 around a second axis parallel to an X axis; a second supporting unit 140 configured to support the second driving units 130a and 130b; and an electrode connecting unit 150 electrically connected to the first driving units 110a and 110b, the second driving units 130a and 130b, and the control device 11.

The optical deflector 13 is, for example, configured by forming the reflecting surface 14, the first piezoelectric driving units 112a and 112b, the second piezoelectric driving units 131a to 131f and 132a to 132f, the electrode connecting unit 150, and the like, on one SOI (Silicon On Insulator) substrate, and subsequently performing etching processing or the like, on the obtained substrate, thereby integrally forming the respective components. Note that the above-described components may be formed after or during the SOI substrate is formed.

The SOI substrate is formed by disposing a silicon oxide layer 162 on a first silicon layer made of single crystal silicon (Si), and further disposing a second silicon layer made of single crystal silicon on the silicon oxide layer 162. Hereinafter, the first silicon layer is referred to as a silicon support layer 161, and the second silicon layer is referred to as a silicon active layer 163. Note that the SOI substrate is used after sintering to form the silicon oxide layer 164 on the surface of the silicon active layer 163.

Since the thickness of the silicon active layer 163 in a Z axis direction is small with respect to an X axis direction or a Y axis direction, the silicon active layer 163, or a member composed of the silicon active layer 163 and the silicon oxide layer 164 has an elastic function. In this embodiment, the silicon oxide layer 164 is provided so as to prevent electrical contact between the silicon active layer 163 and a lower electrode 201; however, the silicon oxide layer 164 may be replaced by another material having insulating properties.

The SOI substrate is not necessarily required to have a planar shape, and may have a curvature or the like. Further, the optical deflector 13 may not necessarily be formed with the SOI substrate; the optical deflector 13 may be formed by any member that can be formed integrally by etching or the like and partially have elasticity.

The mirror unit 101 includes, for example, a circular mirror unit base 102 and a reflecting surface 14 formed on a surface in a +Z direction of the mirror unit base 102. The mirror unit base 102 includes, for example, a silicon active layer 163, and a silicon oxide layer 164.

The reflecting surface 14 is made of a metal thin film containing, for example, aluminum, gold, silver, or the like. In the mirror unit 101, ribs for reinforcing the mirror unit may be formed on a surface in a −Z direction of the mirror unit base 102.

The ribs may include, for example, a silicon support layer 161 and a silicon oxide layer 162, and is configured to reduce distortion of the reflecting surface 14 caused by being moved.

The first driving units 110a and 110b include two torsion bars 111a and 111b, one ends of which are connected to the mirror unit base 102, and extend in a first axis direction, and movably support the mirror unit 101; and first piezoelectric driving units 112a and 112b, one ends of which are connected to the torsion bars 111a and 111b, and the other ends of which are connected to an inner periphery of the first supporting unit 120.

As illustrated in FIG. 6, the torsion bars 111a and 111b each include a silicon active layer 163 and a silicon oxide layer 164. The first piezoelectric driving units 112a and 112b are configured by sequentially forming a lower electrode 201, a piezoelectric unit 202, and an upper electrode 203, on a surface in a +Z direction of an elastic unit, which is a combination of the silicon active layer 163 and the silicon oxide layer 164.

The upper electrode 203 and the lower electrode 201 are made of, for example, gold (Au) or platinum (Pt). The piezoelectric unit 202 is made of, for example, PZT (lead titanate zirconate) which is a piezoelectric material.

Referring back to FIG. 5, the first supporting unit 120 includes, for example, a silicon support layer 161, a silicon oxide layer 162, a silicon active layer 163, and a silicon oxide layer 164. The first supporting unit 120 is a rectangular supporting body formed so as to surround the mirror unit 101.

The second driving units 130a and 130b include, for example, a plurality of second piezoelectric driving units 131a to 131f, and 132a to 132f connected in an accordion-folded manner. One ends of the second driving units 130a and 130b are connected to an outer periphery of the first supporting unit 120, and the other ends of the second driving units 130a and 130b are connected to an inner periphery of the second supporting unit 140. Such an accordion-folded serpentine structure is called a meandering structure. Further, a structure such as the second piezoelectric driving unit, which includes one beam and a member having a driving force, is also called a driving cantilever.

In this case, a connecting part between the second driving unit 130a and the first supporting unit 120, and a connecting part between the second driving unit 130b and the first supporting unit 120 are point symmetrical with respect to the center of the reflecting surface 14. Likewise, a connecting part between the second driving unit 130a and the second supporting unit 140, and a connecting part between the second driving unit 130b and the second supporting unit 140 are point symmetrical with respect to the center of the reflecting surface 14.

As illustrated in FIG. 7, the second driving units 130a and 130b are configured by sequentially forming a lower electrode 201, a piezoelectric unit 202, and an upper electrode 203, on a surface in a +Z direction of an elastic unit, which is a combination of the silicon active layer 163 and the silicon oxide layer 164. The upper electrode 203 and the lower electrode 201 are made of, for example, gold (Au) or platinum (Pt). The piezoelectric unit 202 is made of, for example, PZT (lead titanate zirconate) which is a piezoelectric material.

Referring back to FIG. 5, the second supporting unit 140 includes, for example, a silicon support layer 161, a silicon oxide layer 162, a silicon active layer 163, and a silicon oxide layer 164. The second supporting unit 140 is a rectangular supporting body formed so as to surround the mirror unit 101, the first driving units 110a and 110b, the first supporting unit 120, and the second driving units 130a and 130b.

The electrode connecting unit 150 is, for example, formed on a surface in a +Z direction of the second supporting unit 140, and is electrically connected to the upper electrodes 203 and the lower electrodes 201 of the first piezoelectric driving units 112a and 112b, to the upper electrodes 203 and the lower electrodes 201 of the second piezoelectric driving units 131a to 131f, and to the control device 11, via electrode wiring of aluminum (Al) or the like.

In the present embodiment, an example is given of a case where the piezoelectric unit 202 is formed only on one surface (a surface in a +Z direction) of an elastic unit, which is a combination of the silicon active layer 163 and the silicon oxide layer 164; however, the piezoelectric unit 202 may be provided on the other surface (e.g., a surface in a −Z direction) of the elastic unit, or may be provided on both the surfaces of the elastic unit.

Further, the components of the optical deflector 13 may have any shapes that can drive the mirror unit 101 around the first axis or around the second axis. For example, the torsion bars 111a and 111b or the first piezoelectric driving units 112a and 112b may have a shape having a curvature.

Further, an insulating layer made of a silicon oxide film may be formed on at least one of a surface in a +Z direction of the upper electrode 203 of the first driving units 110a and 110b, a surface in a +Z direction of the first supporting unit 120, a surface in a +Z direction of the upper electrode 203 of the second driving units 130a and 130b, and a surface in a +Z direction of the second supporting unit 140. In this case, the electrode wiring is provided on the insulating layer, and the insulating layer is partially removed to form an opening or is not formed in the connection spot, where the upper electrode 203 or the lower electrode 201 is connected with the electrode wiring. With such a configuration, it is possible to increase flexibility in designing of the first driving units 110a and 110b, the second driving units 130a and 130b, and the electrode wiring; and it is also possible to prevent short circuit due to the contact between electrodes. Note that the insulating layer may be a member having insulating properties, or the insulating layer may be provided with a function as an antireflection material by thinning or the like.

Next, the control of the control device that drives the first driving units and the second driving units of the optical deflector will be described in detail. Upon application of a positive or negative voltage to the piezoelectric units 202 of the first driving units 110a and 110b, and of the second driving units 130a and 130b in a polarization direction, a deformation (e.g., expansion and contraction) occurs in proportion to the potential of the applied voltage, and the piezoelectric units 202 exert a so-called inverse piezoelectric effect. The first driving units 110a and 110b, and the second driving units 130a and 130b move the mirror unit 101 using the above inverse piezoelectric effect. The angle at which light beam incident on the reflecting surface 14 of the mirror unit 101 is deflected is called a deflection angle. The deflection angle indicates a degree of deflection by the optical deflector 13. The deflection angle when no voltage is applied to the piezoelectric unit 202 is set to zero. The deflection angle larger than zero is defined as a positive deflection angle, and the deflection angle smaller than zero is defined as a negative deflection angle.

First, the control of the control device 11 for driving the first driving units 110a and 110b will be described. In the first driving units 110a and 110b, when a drive voltage is applied in parallel to the piezoelectric units 202 of the first piezoelectric driving units 112a and 112b via the upper electrodes 203 and the lower electrodes 201, the respective piezoelectric units 202 will deform. Due to deformation of the piezoelectric units 202, the first piezoelectric driving units 112a and 112b are deformed in a twisted manner.

As a result, a driving force around the first axis acts on the mirror unit 101 via twisting of the two torsion bars 111a and 111b, and the mirror unit 101 moves around the first axis. The drive voltage applied to the first driving units 110a and 110b is controlled by the control device 11.

When the control device 11 concurrently applies a drive voltage of a predetermined waveform to the first piezoelectric driving units 112a and 112b of the first driving units 110a and 110b, the mirror unit 101 will move around the first axis in a period of the drive voltage of a predetermined sinusoidal waveform. Further, when the frequency of a predetermined waveform voltage is set to approximately 20 kHz, which is approximately the same as the resonance frequency of the torsion bars 111a and 111b, the mirror unit 101 is caused to resonate and oscillate at approximately 20 kHz by utilizing the resonance due to the twisting of the torsion bars 111a and 111b.

Next, with reference to FIGS. 8A to 8C, the control of the control device for driving the second driving units will be described. FIGS. 8A to 8C are schematic diagrams illustrating driving of the second driving units 130a and 130b of the optical deflector 13. In FIGS. 8A to 8C, the area indicated by hatching is the mirror unit 101 or the like.

Among a plurality of second piezoelectric driving units 131a to 131f of the second driving unit 130a, second piezoelectric driving units 131b, 131d, and 131f are defined as a piezoelectric driving unit group A (also referred to as a first actuator). The second piezoelectric driving units 131b, 131d, and 131f are even numbered second piezoelectric driving units counted from the second piezoelectric driving unit 131a having the closest distance to the mirror unit 101.

Similarly, among a plurality of second piezoelectric driving units 132a to 132f of the second driving unit 130b, second piezoelectric driving units 132b, 132c, and 132e are also defined as the piezoelectric driving unit group A. The second piezoelectric driving units 132b, 132c, and 132e are odd numbered second piezoelectric driving units counted from the second piezoelectric driving unit 132a having the closest distance to the mirror unit 101. Upon application of a drive voltage in parallel, the piezoelectric driving unit group A is deformed in a twisted manner in the same direction as illustrated in FIG. 8A, and the mirror unit 101 moves around the second axis so as to have a positive deflection angle.

Further, among the plurality of second piezoelectric driving units 131a to 131f of the second driving unit 130a, second piezoelectric driving units 131a, 131c, and 131e are defined as a piezoelectric driving unit group B (also referred to as a second actuator). The second piezoelectric driving units 131a, 131c, and 131e are odd numbered second piezoelectric driving units counted from the second piezoelectric driving unit 131a having the closest distance to the mirror unit 101.

Similarly, among the plurality of second piezoelectric driving units 132a to 132f of the second driving unit 130b, second piezoelectric driving units 132b, 132d, and 132f are also defined as the piezoelectric driving unit group B. The second piezoelectric driving units 132b, 132d, and 132f are even numbered second piezoelectric driving units counted from the second piezoelectric driving unit 132a having the closest distance to the mirror unit 101. Upon application of a drive voltage in parallel, the piezoelectric driving unit group B is deformed in a twisted manner in the same direction as illustrated in FIG. 8C, and the mirror unit 101 moves around the second axis so as to have a negative deflection angle.

As illustrated in FIG. 8B, the deflection angle becomes zero, when no voltage is applied, or when the movable amounts of the mirror unit 101 are substantially the same amount by application of voltage from the piezoelectric driving unit group A and by application of voltage from the piezoelectric driving unit B.

As illustrated in FIGS. 8A and 8C, in the second driving units 130a and 130b, the movable amount of the mirror unit 101 may be accumulated by deforming the piezoelectric units 202 of the piezoelectric driving unit group A or the piezoelectric units 202 of the piezoelectric driving unit group B in a twisted manner so as to increase the deflection angle of the mirror unit 101 around the second axis. Further, the mirror unit 101 may be driven around the second axis by applying a drive voltage to the second piezoelectric driving units to continuously repeat movements illustrated in FIGS. 8A to 8C.

The drive signal (drive voltage) applied to the second driving units 130a and 130b is controlled by the control device 11. The following describes, with reference to FIGS. 9A to 9C, the drive voltage (hereinafter referred to as "drive voltage A") applied to the piezoelectric driving unit group A, and the drive voltage (hereinafter referred to as "drive voltage B") applied to the piezoelectric driving unit group B. In addition, an application unit configured to apply the drive voltage A (first drive voltage) is referred to as a first application unit, and an application unit configured to apply the drive voltage B (second drive voltage) is referred to as a second application unit.

FIG. 9A is a graph illustrating an example of a waveform of the drive voltage A applied to the piezoelectric driving unit group A of the optical deflector 13. FIG. 9B is a graph illustrating an example of a waveform of the drive voltage B applied to the piezoelectric driving unit group B of the optical deflector 13. FIG. 9C is a graph illustrating an example in which the waveform of the drive voltage A becomes superimposed on the waveform of the drive voltage B.

As illustrated in FIG. 9A, a waveform of the drive voltage A applied to the piezoelectric driving unit group A is a sawtooth waveform, and the frequency is 60 Hz, for example. Further, where TrA represents a time width of rise time during which a voltage value increases from its local minimum value to its next local maximum value, and TfA represents a time width of fall time during which a voltage value decreases from its local maximum value to its next local minimum value, TrA:TfA=8.5:1.5 is set in advance with respect to the waveform of the drive voltage A, for example. In this case, the ratio of TrA to one period is referred to as drive voltage A symmetry.

As illustrated in FIG. 9B, the waveform of the drive voltage B applied to the piezoelectric driving unit group B is, a sawtooth waveform, and the frequency is 60 Hz, for example. In addition, where TrB represents a time width of rise time during which a voltage value increases from its local minimum value to its next local maximum value, and TfB represents a time width of fall time during which a voltage value decreases from its local maximum value to its next local minimum value, the waveform of the drive voltage B is set in advance such that TrB:TfB=8.5:1.5, for example. In this case, the ratio of TrB to one period is referred to as drive voltage B symmetry.

As illustrated in FIG. 9C, for example, a waveform period TA of the drive voltage A and a waveform period TB of the drive voltage B are set to be the same. In this case, there is a phase difference d between the drive voltage A and the drive voltage B.

Note that sawtooth waveforms of the drive voltage A and the drive voltage B are generated, for example, by superposition of sinusoidal waves. The frequency (drive frequency fs) of the drive voltage A and the drive voltage B is desirably half integer multiples of the lowest natural frequency f(1) of the optical deflector 13. For example, it is desirable to set fs to 1/5.5 times, 1/6.5 times, 1/7.5 times of f(1). Setting of the drive frequency fs to half integer multiples of the lowest natural frequency f(1) will reduce vibrations caused by harmonic components of the drive frequency. Vibrations that adversely affect such optical scanning are called unnecessary vibrations.

In the present embodiment, a drive voltage having a sawtooth waveform is used for the drive voltages A and B; however, a drive voltage used may have any waveform, which can be changed according to device characteristics of the optical deflector; examples of such a drive voltage include a drive voltage having a sawtooth waveform with rounded waveform apex, a drive voltage having a sawtooth waveform with reshaped linear waveform portions into curve, and the like. In this case, the symmetry is the ratio of the rise time to one period or the ratio of the fall time to one period. Whether the rise time or the fall time is used as a reference may be determined as required.

With reference to FIG. 10, an optical scanning method performed by the image display device 10 will be described.

FIG. 10 is a diagram illustrating optical scanning in the image display device. The image display device 10 deflects light from the light source device 12 in two directions by the optical deflector 13, and optically scans the scannable area 16 including the effective scanning area 17 on the screen member 15 as illustrated in FIG. 10. As described above, in one direction (hereinafter referred to as "X axis direction") out of the two directions, the reflecting surface of the optical deflector is optically scanned using high speed resonance drive by a sinusoidal wave drive signal. In the other direction (hereinafter referred to as "Y axis direction"), the reflecting surface of the optical deflector is optically scanned using low speed dissonance (non-resonance) drive by a sawtooth wave drive signal. Such a driving method of bidirectional optical scanning in a zigzag manner is also called a raster scanning method.

In the above driving method, the effective scanning area 17 may preferably be optically scanned with a constant speed in the Y axis direction. This is because without constant scanning speed in the Y axis direction, luminance unevenness, fluctuation, or the like, of the projected image occur, upon projection of an image by optical scanning, which causes deterioration of the projected image. Such a scanning speed in the Y axis direction is required to be constant for a moving speed around the second axis of the reflecting surface 14 of the optical deflector 13. That is, a change in the deflection angle with time is required to be constant around the second axis of the reflecting surface 14 in the effective scanning area 17.

Next, with reference to FIG. 11 and FIG. 12, the image display device 10 of the present embodiment will be described, and an image projection device to which this image display device 10 is applied will be described in detail. FIG. 11 is a schematic diagram illustrating an automobile 400 according to an embodiment. The automobile 400 is a moving body as a vehicle that includes a head-up display device 500, which is an example of an image projection device. FIG. 12 is a schematic diagram illustrating an example of the head-up display device 500.

As illustrated in FIG. 11, the head-up display device 500 is installed, for example, in the vicinity of a windshield (windshield 401 etc.) of the automobile 400. Projected light (image light) L emitted from the head-up display device 500 is reflected by the windshield 401 and travels toward an observer (driver 402) who is a user. The driver 402 is thus able to view an image projected by the head-up display device 500 as a virtual image. Note that a combiner may be installed on an inner wall surface of the windshield 401, and a driver (user) may view a virtual image with image light reflected by the combiner.

As illustrated in FIG. 12, in the head-up display device 500, laser light is emitted from red, green, and blue laser light sources 501R, 501G and 501B. The emitted laser light passes through an incident optical system and is deflected by an optical deflector 13 having a reflecting surface 14. The incident optical system includes collimator lenses 502, 503, and 504 disposed for the respective laser light sources, two dichroic mirrors 505 and 506, and a light adjustment unit 507. Then, the deflected laser light is focused on a screen of the screen member 15 via a planar mirror 509 to form an intermediate image. The laser light that forms the intermediate image passes through the screen member 15, and is projected by the projection optical system configured by a projection mirror 511. The screen member 15 is provided with a first optical receiver 18 and a second optical receiver 19 configured to receive light reception signals, and the image display device 10 is adjusted by the respective light reception signals.

In the head-up display device 500, the laser light sources 501R, 501G and 501B, the collimator lenses 502, 503 and 504, and the dichroic mirrors 505 and 506 are unitized by an optical housing as a light source unit 530.

The image display device 10 according to the present embodiment includes a light source unit 530, an optical deflector 13, a control device 11, a planar mirror 509, and a screen member 15.

The head-up display device 500 projects an intermediate image displayed on the screen member 15 onto the windshield 401 of the automobile 400 such that a driver 402 visually perceives the intermediate image as a virtual image.

Color laser beams emitted from the laser light sources 501R, 501G and 501B form substantially collimated light beams by the collimator lenses 502, 503 and 504, respectively, which are synthesized by the two dichroic mirrors 505 and 506. The amount of the synthesized laser light is adjusted by the light adjustment unit 507, and the synthesized laser light is two-dimensionally scanned by the optical deflector 13 having the reflecting surface 14. The projection light (image light) L that has been two-dimensionally scanned by the optical deflector 13 is reflected by the planar mirror 509, and then is converged on the screen member 15 to form an intermediate image.

The screen member 15 is constituted by a microlens array having two-dimensionally arranged microlenses, and is configured to diverge and magnify (enlarge) the projection light L incident on the screen member 15 in units of microlenses.

The optical deflector 13 makes the reflecting surface 14 reciprocate in two axial directions so as to two-dimensionally scan the projection light L incident on the reflecting surface 14. The drive control of the optical deflector 13 is performed in synchronization with light emitting timing of the laser light sources 501R, 501G and 501B.

The head-up display device 500 has been illustrated as an example of the image projection device as described above. However, the image projection device may be any device that projects an image by performing optical scanning with the optical deflector 13 having the reflecting surface 14. The image projection device of the present embodiment may be similarly applied to a projector that projects an image on a display screen, or may be applied to a head mounted display device mounted on a mounting member to be worn on the head of an observer or the like, and the image projection device projects an image onto a reflective or transmissive screen of the mounting member, or projects an image onto the eyeball as a display screen.

Further, the image projection device may be used not only for a vehicle or a mounting member but may also be used for other moving bodies, such as an aircraft, a ship, a mobile robot; or used for non-moving bodies such as a working robot for operating a driving object such as a manipulator that does not move from one place.

Next, an arrangement of the screen member 15, which is a characteristic of the present invention, will be described. FIG. 13 is a diagram illustrating a situation in which visibility of a projected image is deteriorated by external light. When an optical member having a function of reflecting light is disposed in the vicinity of optical patha Ln0 of light traveling toward the laser light sources along normala with respect to the screen 15a, external light (ambient light from outside) entering the screen 15a of the screen member 15 traveling toward the laser light sources may be reflected by the light emitting surface of the optical member, and the reflected light may return to the screen 15a. The optical path Ln0 includes optical paths in which light rays reflected and refracted by an intermediate optical member. The screen 15a includes at least the effective scanning area 17 on an incident surface of the screen member 15. For example, as illustrated in FIG. 13, external light Ln1 is reflected by a reflecting surface (light emitting surface) 509a of the planar mirror 509. The reflected external light Ln2 returns to the screen 15a and is incident on the screen 15a. The reflected external light Ln2 incident on the screen 15a passes through the screen member 15 in the same path as image forming light of a projected image. The reflected light passing through the screen member 15 is thus superimposed on the projected image, which is visually perceived by the observer (the driver 402). As a result, visibility of the projected image may deteriorate.

Among the optical members disposed between a set of the laser light sources 501R, 501G and 501B, and the screen 15a, there is an optical member that has a substantially planar light emitting surface, and is disposed to be inclined with respect to the optical path direction of light Ln1 traveling toward the laser light sources along normals with respect to the screen 15a. For example, in the present embodiment, the planar mirror 509 has a substantially planar reflecting surface (light emitting surface) 509a, and is disposed to be inclined with respect to the optical path direction of the light Ln1 traveling toward the laser light sources along normals with respect to the screen 15a.

In the optical member arranged as described above (hereinafter, described as an example of the planar mirror 509), when the external light Ln1 from the screen 15a is reflected by the reflecting surface (light emitting surface) 509a of the planar mirror 509, the reflected external light Ln2 travels toward a specular reflection direction on the other side of a normal N with respect to a reflected position on the reflecting surface 509a. That is, when the planar mirror 509 arranged with respect to the screen 15a as described above, the external light Ln2 reflected by the reflecting surface 509a of the planar mirror 509 does not return by the same traveling path as the traveling path of the external light Ln1 incident to the reflecting surface 509a of the planar mirror 509. Hence, with the planar mirror 509 arranged in this manner, most of the rays of the external light Ln1 traveling from the screen 15a toward the reflecting surface 509a of the planar mirror 509, even if reflected by the reflecting surface 509a of the planar mirror 509, will be reflected away from the screen 15a, which will not cause deterioration in the visibility of the projected image.

However, even with the planar mirror 509 arranged as described above, as illustrated in FIG. 13, a part of the external light Ln1, which travels from the screen 15a toward the reflecting surface 509a of the planar mirror 509, is reflected by the reflecting surface 509a of the planar mirror 509 and returns to the screen 15a. As a result, the returned light that has passed through the screen 15a as external light Ln3 will be superimposed on the projected image, thereby deteriorating the visibility of the projected image. Thus, even if only a part of the external light Ln1 that is reflected by the reflecting surface 509a, it is desirable to prevent such reflected light (specular reflected light) from returning to the screen 15a.

FIG. 14 is a diagram illustrating a situation where visibility of a projected image deteriorates due to external light when the planar mirror 509 illustrated in FIG. 13 is replaced by a curved mirror 509'. In FIG. 14, the planar mirror 509 illustrated in FIG. 13 is replaced by a curved mirror 509'. In this case, as with the planar mirror 509, returned light is also superimposed on the projected image thereby deteriorating the visibility of the projected image. That is, as illustrated in FIG. 14, a part of the external light Ln1, which travels from the screen 15a toward a reflecting surface 509a' of a curved mirror 509', is reflected by the reflecting surface 509a' of the curved mirror 509' returns to the screen 15a. As a result, this returned light that has passed through the screen 15a as external light Ln3 will be superimposed on the projected image, thereby deteriorating the visibility of the projected image.

FIG. 15 is a diagram illustrating an arrangement of a planar mirror 509 according to an embodiment. In this embodiment, the planar mirror 509 is disposed such that the reflected light, along normals with respect to every reflecting point on the optical member, including the reflected light closer to the reflecting surface 509a, is redirected away from the screen 15a. More specifically, the planar mirror 509 is disposed such that reflected light closest to the screen 15a along normals N with respect to an end 509b is directed away from the screen 15a, where the end 509b is one end of the reflecting surface 509a in an inclined direction of the planar mirror 509; the end 509b is located within the optical path range Ln0 of light traveling toward the laser light sources along normals (a horizontal direction in FIG. 15) with respect to the screen 15a; and a length of an optical path between the screen 15a and the end 509b of the planar mirror 509 is the shortest, among optical paths between the screen 15a and other reflecting surface portions located within the optical path range Ln0. That is, the planar mirror 509 is disposed so as to overlap with the optical path range Ln0 of light traveling toward the laser light sources of an image along normals (the horizontal direction in FIG. 15) with respect to the screen 15a. Further, the planar mirror 509 is disposed such that the reflecting surface 509a is inclined with respect to an optical axis direction of light traveling toward the laser light sources along normals with respect to the screen 15a so as to reduce an optical path length between the one end 509b of the reflecting surface 509a (light emitting surface) and the screen 15a, and such that the light traveling along normals N with respect to the one end 509b of the reflecting surface 509a closest to the screen 15a is directed away from the screen 15a. In the present embodiment, the one end is an upper end 509b of the reflecting surface 509a of the planar mirror 509. Thus, the planar mirror 509 is disposed so as to direct away from the screen 15a, light closest to the screen 15a along normals N with respect to the upper end 509b of the reflecting surface 509a of the planar mirror 509.

With the planar mirror 509 having a substantially planar reflecting surface 509a (light emitting surface), and being disposed to be inclined with respect to the optical path direction of the light traveling toward the laser light sources along normals with respect to the screen 15a (horizontal direction in FIG. 15), when the external light Ln1 from the screen 15a is reflected at a given reflected position on the reflecting surface 509a of the planar mirror 509, the reflected external light Ln2 travels toward a specular reflection direction on the other side of the normal with respect to the reflected position on the reflecting surface 509a. In this case, a difference ε between an emission position 15b and a return position 15c decreases as the optical path length between the reflected position on the reflecting surface 509a of the planar mirror 509 and the screen 15a decreases, where the emission position 15b is a position at which the external light Ln1 is emitted from the screen 15a, and the return position 15c is a position at which the external light Ln1 that has been reflected by the reflecting surface 509a of the planar mirror 509 passes through a virtual plane P0, which is flush with the screen 15a. When the optical path length between the screen 15a and the end 509b of the reflecting surface 509a of the planar mirror 509 located within the optical path range Ln0 is the shortest, among optical path lengths between the screen 15a and the other light emitting surface portions located within the optical path range Ln0, the planar mirror 509 is disposed so as not to return, to the screen 15a, the reflected external light Ln2 reflected by the upper end 509b. With this arrangement, even when the external light Ln1 from the screen 15a is reflected by the reflecting surface 509a of the planar mirror 509, the reflected external light (specularly reflected external light) will be prevented from returning to the screen 15a.

In the present embodiment, as illustrated in FIG. 15, the planar mirror 509 is disposed so as to direct away from the screen 15a, the reflected light traveling along normals N with respect to the upper end 509b of the reflecting surface 509a closest to the screen 15a, where the upper end 509b is one end of the reflecting surface 509a in the inclined direction of the planar mirror 509; the upper end 509b is located within the optical path range Ln0 of light traveling toward the laser light sources along normals (a horizontal direction in FIG. 15) with respect to the screen 15a; and the optical path length between the screen 15a and the upper end 509b is the shortest, among optical paths between the screen 15a and the other reflecting surface portions located within the optical path range Ln0. In this case, the external light Ln1, which is incident on the upper end 509b of the reflecting surface 509a of the planar mirror 509 from the screen 15a, invariably passes from the screen (an upper side in FIG. 15) and is incident obliquely with respect to the normal N, which is a normal with respect to the upper end 509b. Then, because such incident external light Ln1 becomes reflected in a specular reflection direction on the other side of the normal N, the reflected light passes through a point further away from the screen 15a (a lower side of the screen 15a in FIG. 15) than the normal N, on a virtual plane P0, which is flush with the screen 15a.

Hence, according to the present embodiment, even if the external light Ln1 from the screen 15a is reflected by the reflecting surface 509a of the planar mirror 509, the reflected external light (specularly reflected external light) Ln2 will be prevented from returning to the screen 15a. Thus, it is possible to prevent a situation in which the external light Ln1 from the screen becomes superimposed on the projected image thereby deteriorating the visibility of the projected image.

Furthermore, in the present embodiment, an intermediate image is a substantially rectangular image with a short side in a vertical direction and a longitudinal side in a horizontal direction. In this case, optical path lengths differ between the screen 15a and respective positions on the reflecting surface 509a corresponding to the short side vertical direction of the intermediate image of the planar mirror 509. In the present embodiment, as described above, the planar mirror 509 is disposed such that the normal N with respect to the upper end 509b on the reflection surface 509a of the planar mirror 509 passes outside the screen 15a in a direction along the short side of the intermediate image. In this case, the optical path lengths further increase between the screen 15a and the respective positions on the reflecting surface 509a corresponding to the short side vertical direction of the intermediate image. As a result, the difference between focal positions in the short side vertical direction of the intermediate image becomes large, which may deteriorate image quality of the intermediate image.

However, in this embodiment, the planar mirror 509 is disposed such that the normal N passes outside the screen 15a in a direction along the short side of the intermediate image. Thus, with this arrangement, it is possible to minimize the difference in optical path lengths between respective positions on the reflecting surface 509a and the screen 15a, as compared with the arrangement where the planar mirror 509 is arranged such that the normal N passes outside the screen 15a in the direction along the longitudinal side of the intermediate image. As a result, deterioration of the image quality of the intermediate image may be prevented.

Alternatively, the planar mirror 509 may be disposed such that the normal N passes the outside of the screen 15a in the direction along the longitudinal side of the intermediate image. With this arrangement, there is an advantageous effect of increasing the flexibility in layout.

FIG. 16 is a diagram illustrating an arrangement in a case where the planar mirror 509 illustrated in FIG. 15 is replaced by a curved mirror 509'. In FIG. 16, the planar mirror 509 illustrated in FIG. 15 is replaced by the curved mirror 509'; however, the same effect as that of the planar mirror 509 is obtained. That is, as illustrated in FIG. 16, when the curved mirror 509' is disposed such that the reflected light, along normals N with respect to every reflecting point on the reflecting surface 509'a, including the reflected light closer to the screen 15a is directed away from the screen 15a, any rays incident on the curved mirror 509' from the screen 15a do not return directly to the screen 15a. Thus, it is possible to obtain the same effect as that of the planar mirror 509 illustrated in FIG. 15.

As described above, the optical member is an example of a mirror that is a light reflecting member; however, any optical member having a function of reflecting light, such as a lens, a polarizing plate, a filter element and the like may be applicable. Further, any optical member may be applicable irrespective of shape such as a planar or a curved surface.

First Modification

Next, a modification of an arrangement of the screen member 15 in the present embodiment (hereinafter, this modification will be referred to as "first modification") will be described. In the above-described embodiment, the planar mirror 509 is an optical member, which is a light reflecting member disposed on optical paths between the laser light sources 501R, 501G and 501B, and the screen 15a. The planar mirror 509 has a substantially planar light emitting surface 509a, and the planar mirror 509 is disposed such that the optical path lengths from the light emitting surface 509a of the planar mirror 509 to the screen 15a vary at respective positions on the light emitting surface 509a. In the first modification, an IR cut filter which is a light transmitting member is used as the optical member.

FIG. 17 is a diagram illustrating an arrangement of an IR cut filter 512 in the first modification. In the first modification, an IR cut filter 512 configured to cut infrared light is disposed between laser light sources and the screen 15a. The IR cut filter 512 cuts (reflects) an infrared light component when external light (infrared light entering from the outside) including infrared light such as sunlight enters so as to prevent temperature rise, where the temperature rise results from absorption of the infrared light component by the optical member or the like (e.g., optical deflector 13), which is located closer to the laser light sources than the IR cut filter 512 is.

As with the planar mirror 509 of the above-described embodiment, the IR cut filter 512 also has a substantially planar light emitting surface 512a, and is disposed to be inclined with respect to an optical path direction of light toward the laser light sources along normals with respect to the screen 15a. With such an IR cut filter 512, a part of the external light traveling toward the laser light sources along normals with respect to the screen 15a may also be reflected by the light emitting surface 512a of the IR cut filter 512 and return to the screen 15a. In this case, the returned external light may pass through the screen 15a to be superimposed on the projected image to deteriorate the visibility of the projected image.

To prevent this, in the first modification, as illustrated in FIG. 17, the IR cut filter 512 is disposed such that the reflected light, along normals N with respect to the upper end 512b on the light emitting surface 512a, including the reflected light closer to the screen 15a is directed away from the screen 15a, where the upper end 512b is one of ends (upper end and lower end in FIG. 17) of the light emitting surface 512a in an inclined direction of the IR cut filter 512; the upper end 512b is located within an optical path range Ln0 of light traveling toward the laser light sources along normals with respect to the screen 15a; and optical path length between the screen 15a and the upper end 512b is the shortest, among optical paths between the screen 15a and other light emitting surface portions located within the optical path range Ln0. That is, the IR cut filter 512 is disposed so as to overlap with the optical path range Ln0 of the light traveling toward the laser light sources of an image along the normal with respect to the screen 15a. Further, the IR cut filter 512 is disposed such that the light emitting surface 512a is inclined with respect to an optical axis direction of the light traveling toward the laser light sources along normals with respect to the screen 15a so as to reduce the optical path length between the one end (upper end 512b) of the light emitting surface 512a (light emitting surface) and the screen 15a, and such that the light closer to the screen 15a along the normal with respect to the upper end 512b on the light emitting surface 512a is directed away from the screen 15a. In this case, external light incident on the upper end 512b of the light emitting surface 512a of the IR cut filter 512 invariably travels from the screen 15a and is incident obliquely with respect to the normal N with respect to the upper end 512b. Then, such incident external light travels in a specular reflection direction on the other side of the normal N. The incident external light thus passes through a point further away from the screen 15a (a right side of the screen 15a in FIG. 17) than the normal N on the virtual plane P0, which is flush with the screen 15a.

Hence, according to the first modification, even if the external light from the screen 15a is reflected by the light emitting surface 512a of the IR cut filter 512, the reflected external light (specularly reflected external light) will be prevented from returning to the screen 15a. Thus, it is possible to prevent a situation in which the external light from the screen 15a becomes superimposed on the projected image to deteriorate the visibility of the projected image.

Second Modification

Next, another modification of an arrangement of the screen member 15 in the present embodiment (hereinafter, this modification will be referred to as "second modification") will be described. In the above-described embodiments and the first modification, there is only one optical member disposed on the optical path between the optical deflector 13 and the screen 15a; and in this second modification, a plurality of the optical members are disposed on the optical path between the optical deflector 13 and the screen 15a.

FIG. 18 is a diagram illustrating an arrangement of a first planar mirror 509A and a second planar mirror 509B, which are respective optical members in the second modification. As described above, an optical member is disposed such that reflected light, along normals N with respect to every reflecting point on the reflecting surface, including the reflected light closer to the screen 15a is directed away from the screen 15a, and an arrangement will be the same even when there are two optical members, that is, a first planar mirror 509A as a first optical member and a second optical member as a second planar mirror 509B.

In the second modification, the first planar mirror 509A is disposed closer to the screen 15a than the second planar mirror 509B is (the optical path length from the first planar mirror 509A to the screen 15a is shorter than that of the second planar mirror 509B), and the second planar mirror 509B is further away from the screen 15a than the planar mirror 509A is (the optical path length from the second planar mirror 509B to the screen 15a is longer than that of the first planar mirror 509A). For external light Ln3 that had entered the screen 15a and had been reflected by the second planar mirror 509B and that is further reflected by the first planar mirror 509A as an external light Ln4, if the external light Ln4 were to be directed closer to the screen 15a and return to the screen 15a, a situation would be caused in which the external light Ln4 having passed through the screen 15a would be superimposed on the projected image to deteriorate the visibility of the projected image.

Thus, in the second modification, in order to avoid such a situation, the second planar mirror 509B is disposed such that the reflected light LN, along normals N with respect to every reflecting point on a reflecting surface of the second planar mirror 509B, including the reflected light closer to the screen 15a via the first planar mirror 509A is directed away from the screen 15a. In this configuration, any light incident on the second planar mirror 509B from the screen 15a will not return directly to the screen 15a, and the same advantageous effect as the above-described embodiment and first modification will be obtained.

Note that in the second modification, at least one of the first planar mirror 509A and the second planar mirror 509B may be an optical member having other functions, such as a lens having a curvature, or another shape. For example, as illustrated in FIG. 19, when the first planar mirror 509A is a lens 509A' having a curvature, reflected light LN along a normal N with respect to the second planar mirror 509B closest to the screen 15a via the lens 509A' would be refracted and transmitted through the inside of the lens 509A' as with ordinary light. Thus, based on such consideration, the lens 509A' is disposed so as to direct the light LN away from the screen 15a.

Note that in this second modification, the number of optical members is two; however, the same advantageous effect will be obtained when the number of optical members is three or more.

In the configuration of the present invention, an advantageous effect will be obtained regardless of types of the screen member 15 such as a transparent type or a reflective type. That is, a light diffusion plate, a micro lens array, a micromirror array, or the like may be used for the screen member 15 where appropriate for example. The configuration of the present invention is an example in which the optical deflector 13 is used as an image forming element; however, another image forming element such as a DMD (Digital Mirror Device) may be used.

Although the embodiments of the present invention (including modifications, the same applies hereinafter) have been described, the above-described embodiments merely illustrate applicable examples of the present invention. The present invention is not limited to the above-described embodiments as they are, and may be embodied by various modifications and changes in the implementation stage without departing from the gist thereof.

The above illustrations are merely examples, and specific effects may be provided for each of the following aspects.

Aspect 1

According to Aspect 1, an image display device configured to display an image on a screen 15a includes an optical member (e.g., a planar mirror 509, and an IR cut filter 512) having a substantially planar light emitting surface, and being disposed along a normal with respect to the screen 15a so as to overlap with an optical path of light traveling toward laser light sources (e.g., laser light sources 501R, 501G and 501B), where the optical member is disposed such that the optical member is inclined with respect to an optical axis direction of light traveling toward the laser light sources along normals with respect to the screen 15a so as to reduce an optical path length between a first end of the light emitting surface and the screen 15a, and such that the reflected light, along normals with respect to one end of the light emitting surface, including the reflected light closer to the screen 15a is directed away from the screen 15a.

When an optical member is disposed so as to overlap with an optical path (including an optical path in which light that is reflected or refracted by an intermediate optical member) of the light traveling toward the laser light sources along normals with respect to the screen 15a, the external light entering the screen 15a toward the laser light sources may be reflected by the light emitting surface of the optical member and return to the screen 15a.

Such an external light returning to the screen 15a in this manner enters the screen 15a and becomes superimposed on a displayed image, which may deteriorate the visibility of the image. Note that among the optical members disposed between the laser light sources and the screen 15a, there is an optical member having a substantially planar light emitting surface, and disposed to be inclined with respect to an optical axis direction of the light traveling toward the laser light sources along normals with respect to the screen 15a. With such an optical member, when the external light from the screen 15a is reflected by the optical member, the reflected external light travels in a specular reflection direction on the other side of a normal with respect to a reflected position on the light emitting surface. Thus, the reflected external light does not return by the same optical path as the optical path of the external light incident on the light emitting surface of the optical member. Hence, with the optical member disposed as described above, most of the rays of the external light from the screen toward the light emitting surface of the optical member, even if reflected by the light emitting surface of the optical member, will be reflected away from the screen. Thus, the reflected external light will not be superimposed on a displayed image to deteriorate the visibility of the image.

However, even with the optical member disposed as described above, a part of the external light traveling from the screen toward the light emitting surface of the optical member is reflected by the light emitting surface of the optical member and returns to the screen. Thus, such reflected external light would, though only part of it, eventually become superimposed on an image to deteriorate the visibility of the image. Hence, even if only a part of external light traveling from the screen toward the light emitting surface of the optical member, which is reflected by the light emitting surface, it is desirable to prevent such reflected light (specular reflection light) from returning to the screen. Thus, in this aspect 1, the optical member described above is disposed such that reflected light, along a normal with respect to a first end of the light emitting surface, including the reflected light closest to the screen is directed away from the screen, where the first end of the light emitting surface is located within an optical path range of light traveling toward the laser light sources along normals with respect to the screen (including an optical path in which light is reflected or refracted by an intermediate optical member), and an optical path length between the screen and the first end of the light emitting surface located within the optical path range is the shortest, among optical paths between the screen and other light emitting surface portions located within the optical path range.

In an optical member having a substantially planar light emitting surface and being inclined with respect to an optical axis direction of light traveling toward the laser light sources along the normal with respect to the screen, when external light from the screen is reflected by the light emitting surface of the optical member, the reflected external light travels in a specular reflection direction on the other side of a normal with respect to a reflected position on the light emitting surface, as described above.

In this case, a difference between an emission position and a return position becomes smaller as the optical path length between the screen and the reflected position on the light emitting surface decreases, where the emission position is a position at which the external light is emitted from the screen, and the return position is a position at which the external light that has been reflected by the light emitting surface of the optical member passes through a virtual plane, which is flush with the screen. When a length of the optical path between the screen and the end of the light emitting surface located within the optical path range is the shortest, among optical paths between the screen and the other light emitting surface portions located within the optical path range, the optical member is disposed such that the external light reflected by the end of the light emitting surface will not return to the screen. Such an arrangement of the optical member will prevent the reflected external light (specularly reflected external light) from returning to the screen, even when the external light from the screen is reflected by the light emitting surface of the optical member and travels back to the screen.

According to the aspect 1, an optical member disposed so as to overlap with optical paths of light traveling toward the laser light sources along normals with respect to the screen. When such an optical member is disposed such that the light emitting surface of the optical member is inclined with respect to an optical axis direction of the light traveling toward the laser light sources along normals with respect to the screen so as to decrease a length of the optical path between one end of the light emitting surface and the screen, the reflected light, along normals with respect to the one end of the light emitting surface, including the reflected light closer to the screen is directed away from the screen.

In this case, the external light incident from the screen onto the one end of the light emitting surface of the optical member will invariably be incident obliquely from the screen with respect to a normal to the one end of the light emitting surface. Because such external light obliquely incident from the screen become reflected in a specular reflection direction on the other side of the normal with respect to the one end on the light emitting surface, the reflected light passes through a point further away from the screen than the normal, on a virtual plane, which is flush with the screen. Thus, according to the aspect 1, even when external light incident from the screen is reflected by the light emitting surface of the optical member, it is possible to prevent the reflected external light (specularly reflected external light) from returning to the screen. Thus, even when external light entering the screen toward the laser light sources is reflected by the light emitting surface of the optical member, it is possible to prevent deterioration in the visibility of an image due to the external light being reflected on the screen.

Aspect 2

According to Aspect 2, in the image display device according to aspect 1, the optical member is located closest to the screen compared to other optical members. Such an optical member disposed as above will deviate, from the screen, the largest amount of external light returning to the screen compared to other optical members; thus, high effect of preventing the deterioration of the visibility of the image caused by the returned external light may be obtained.

First Aspect

According to Aspect 1, an image display device configured to display an image on a screen 15a includes an image forming element (e.g., an optical deflector 13); and an optical member disposed between the screen and the image forming element configured to reflect light, and configured to reflect light (e.g., planar mirrors 509, 509A, 509B, curved mirror 509', IR cut filter 512, lens 509A'), where the optical member is disposed such that the reflected light, along normals with respect to every reflecting point on a reflecting surface of the optical member, is directed away from the screen. With such an arrangement, any rays incident on the optical member from the screen will not return directly to the screen. Thus, according to the first aspect, even when external light incident from the screen is reflected by the light emitting surface of the optical member, it is possible to prevent the reflected external light (specularly reflected external light) from returning to the screen.

Second Aspect

In a second aspect of the image display device according to the first aspect, the optical member includes a first optical member located close to the screen and a second optical member located away from the screen, and the second optical member is disposed such that the reflected light, along normals with respect to every reflecting point on the second optical member, via the first optical member is directed away from the screen.

According to this configuration, any rays incident on the second optical member from the screen will not directly return to the screen via the first optical member. Thus, according to the second aspect, even when external light incident from the screen is reflected by the light emitting surface of the second optical member, it is possible to prevent the reflected external light (specularly reflected external light) from returning to the screen.

Third Aspect

In a third aspect of the image display device according to the first or second aspect, includes an optical scanning member (e.g., an optical deflector 13) configured to optically scan the screen with light from a light source to form an image on the screen, where the optical member guides light from the optical scanning member toward the screen. According to this configuration, in the image display device that forms an image by the optical scanning method, deterioration of the visibility of the image caused by external light may be prevented.

Fourth Aspect

In a fourth aspect of the image display device according to any one of the first to third aspects, the optical member is disposed such that the reflected light along the normals is directed outside of the screen in a direction along a short side of the image. According to this configuration, even if the optical member is disposed as described above, image quality deterioration of the image may be prevented.

Fifth Aspect

In a fifth aspect of the image display device according to any one of the first to third aspects, the optical member is disposed such that the reflected light along the normals is directed outside of the screen in a direction along a longitudinal side of the image. According to this configuration, an effect of increasing the flexibility of layout may be obtained, which is advantageous for downsizing of the image display device, for example.

Sixth Aspect

In a sixth aspect of the image display device according to any one of the first to fifth aspects, the screen is a transparent screen. Since the transparent screen easily guides external light (ambient light) from the outside to the optical member, the visibility of the image is liable to be deteriorated by external light; however, according to the configuration of the sixth aspect, deterioration of the visibility of the image due to external light may be prevented.

Seventh Aspect

In a seventh aspect of the image display device according to any one of the first to fifth aspects, the screen is a reflective screen. Since the reflective screen easily guides external light (ambient light) from the outside to the optical member as with the transparent screen, the visibility of the image is liable to be deteriorated by external light; however, according to the configuration of the seventh aspect, deterioration of the visibility of the image due to external light may be prevented.

Eighth Aspect

According to an eighth aspect, an image projection device (e.g., a head-up display device 500) includes an image display device according to any one of the first to seventh aspects; and a projection optical system (e.g., a projection mirror 511) configured to project an image formed on the screen by the image display device.

According to this configuration, it is possible to project an image from which degradation of visibility due to external light is prevented.

Ninth Aspect

According to an eighth aspect, a moving body includes an image display device according to any one of the first to seventh aspects or an image projection device (head-up display device 500) according to the eighth aspect. According to this, it is possible to provide a moving body on which an image, from which deterioration of visibility due to external light is prevented, is projected.

REFERENCE SIGNS LIST 10 image display device
11 control device
12 light source device
13 optical deflector
14 reflecting surface
15 screen member
16 scannable area
17 effective scanning area
30 controller
400 automobile
401 windshield
402 driver
500 head-up display device
501R, 501G, 501B laser light source
502-504 collimator lens
505, 506 dichroic mirror
507 light adjustment unit
509, 509A, 509B planar mirror
509' curved mirror
509A' lens
509a, 509'a reflecting surface
509b, 509'b upper end
511 projection mirror
512 IR cut filter
512a light emitting surface
512b upper end The present application is based on and claims priority of Japanese Priority Application No. 2018-050900 filed on Mar. 19, 2018, and Japanese Priority Application No. 2018-193809 filed on Oct. 12, 2018, the entire contents of which are hereby incorporated herein by reference.

The invention claimed is:

1. An image display device, comprising:
an image forming element; and
an optical element to reflect image light from the image forming element toward a screen,
wherein:
the optical element includes a first optical element which reflects light and a second optical element which also reflects light,
the optical element is disposed such that the reflected light, along normals with respect to every reflecting point on the optical element, is directed away from the screen, and
the second optical element is disposed such that the reflected light, along normals with respect to every reflecting point on the second optical element, via the first optical element is directed away from the screen.

2. The image display device according to claim 1, further comprising:
an optical scanner configured to optically scan the screen with light from a light source to form an image on the screen, wherein the optical element guides light from the optical scanner toward the screen.

3. The image display device according to claim 1, wherein the optical element is disposed such that the reflected light along the normals is directed outside of the screen in a direction along a short side of the image.

4. The image display device according to claim 1, wherein the optical element is disposed such that the reflected light along the normals is directed outside of the screen in a direction along a longitudinal side of the image.

5. The image display device according to claim 1, wherein the screen is a transparent screen.

6. The image display device according to claim 1, wherein the screen is a reflective screen.

7. An image projection device comprising:
the image display device according to claim 1; and
a projection optical system configured to project an image formed on the screen by the image display device.

8. A moving body comprising:
the image display device according to claim 1.

* * * * *